(12) United States Patent
Kot et al.

(10) Patent No.: US 11,485,882 B2
(45) Date of Patent: Nov. 1, 2022

(54) RECYCLING COMPATIBLE PSA LABEL

(71) Applicant: UPM Raflatac Oy, Tampere (FI)

(72) Inventors: Weronika Kot, Wroclaw (PL); Oona Koski, Tampere (FI); Johanna Karhu, Nokia (FI)

(73) Assignee: UPM RAFLATAC OY, Tampere (FI)

( * ) Notice: Subject to any disclaimer, the term of this patent is extended or adjusted under 35 U.S.C. 154(b) by 461 days.

(21) Appl. No.: 16/718,458

(22) Filed: Dec. 18, 2019

(65) Prior Publication Data
US 2020/0199415 A1  Jun. 25, 2020

(30) Foreign Application Priority Data

Dec. 21, 2018  (EP) ..................................... 18215338

(51) Int. Cl.
| | | |
|---|---|---|
| *C09J 7/38* | (2018.01) | |
| *C09J 7/21* | (2018.01) | |
| *C08F 220/10* | (2006.01) | |
| *C08L 53/00* | (2006.01) | |
| *C09J 133/08* | (2006.01) | |

(52) U.S. Cl.
CPC .............. *C09J 7/385* (2018.01); *C08F 220/10* (2013.01); *C08L 53/005* (2013.01); *C09J 7/21* (2018.01); *C09J 133/08* (2013.01); *C09J 2203/334* (2013.01); *C09J 2301/414* (2020.08); *C09J 2301/502* (2020.08); *C09J 2405/00* (2013.01); *C09J 2433/00* (2013.01); *C09J 2471/00* (2013.01)

(58) Field of Classification Search
CPC ... C09J 7/385; C09J 7/21; C09J 133/08; C09J 133/10; C09J 133/04; C09J 2203/334; C09J 2405/00; C09J 2433/00; C09J 2471/00; C09J 171/02; C08F 220/10; C08L 53/005; C08L 71/02
See application file for complete search history.

(56) References Cited

U.S. PATENT DOCUMENTS

| | | |
|---|---|---|
| 2005/0282961 A1 | 12/2005 | Tsai et al. |
| 2012/0021237 A1 | 1/2012 | Confalone et al. |
| 2014/0248490 A1* | 9/2014 | Morimoto ............... C08L 71/02 524/106 |

FOREIGN PATENT DOCUMENTS

| | | |
|---|---|---|
| EP | 2562226 A1 | 2/2013 |
| WO | 9310177 A1 | 5/1993 |
| WO | 2014039796 A2 | 3/2014 |
| WO | WO-2017136279 A1 * | 8/2017 .............. C09J 7/241 |

* cited by examiner

*Primary Examiner* — Scott R. Walshon
(74) *Attorney, Agent, or Firm* — Cantor Colburn LLP

(57) ABSTRACT

A label which is attachable to object surfaces includes a pressure sensitive adhesive layer having a coat weight equal to or higher than 10 g/m². The adhesive layer has a composition which is free of alkylphenol ethoxylate and has been selected to comprise emulsion polymerized, water-dispersible acrylate polymer and non-ionic copolymer based on polyethylene glycol and polypropylene glycol such that when the adhesive layer is subjected to paper recycling process conditions, the adhesive layer resists disintegration into small fragments.

15 Claims, 4 Drawing Sheets

RECYCLING COMPATIBLE PSA LABEL

CROSS REFERENCE TO RELATED APPLICATIONS

This application claims priority to and the benefit of EP Application No. 18215338.7, filed Dec. 21, 2018, the contents of which are incorporated herein by reference in their entirety

TECHNICAL FIELD

The invention relates to a recycling compatible pressure sensitive adhesive label. The invention further relates to a method for manufacturing such label. Some variations may relate to use of a composition as pressure sensitive adhesive layer of such label. Some variations may relate to labeling applications. Some variations may relate to labeling of recoverable cellulose fiber-based paper products.

BACKGROUND

Adhesives are used for several purposes. Adhesive refers to a substance, such as a glue, which has an ability to bind two separate items together and resist their separation. Adhesives are widely used on labels.

Label advertisement is a growing industry. Label advertisement in this context refers to the use of a label on an object surface to present information. An object in this context is a paper product, such as an envelope, a book, a newspaper, a journal or a magazine. The object surface may therefore require printability. The object surface may also be of package material capable to adhere with an adhesive label. The package material may be made of flexible polymeric material, such as plastic film. In some cases, the package material may also be a container that may be labeled with an adhesive label, such as a container made of glass and/or plastic.

In label advertisement, the label may be provided to a user on a release liner, who may, when necessary, adhere the label to an object surface. Label advertisement may be used, for example, to update information or promote items put on sale. Alternatively, label advertisement may be used, for example in e-commerce solutions, to provide supplementary information. A preprinted adhesive label may, for example, facilitate the possible return of an item from a customer to a vendor. The vendor may supply an item together with an adhesive label containing preprinted information, which the customer may later adhere on a surface of a package material, should the item be returned to the vendor.

A challenge relating to label advertisement is that the label should be user friendly, such that the label may be adhered on a variety of surfaces without particular skills or equipment. This requires a label having self-adhesive properties.

To provide adhesive characteristics on the label, a pressure sensitive adhesive, hereafter denoted as 'PSA', may be used. PSA is a specific type of an adhesive, which adheres to a surface when pressure is applied. Such pressure sensitive adhesive may also be called a self-adhesive or sticker adhesive. A PSA label may be categorized as being of a permanent type or of a removable type. A permanent PSA label may be used for label advertisement on products, wherein the user does not need to remove the label from the object surface. A removable PSA label can be used for label advertisement on paper products, in cases where visual damage to the paper surface needs to be avoided. The characteristics of a PSA may be modelled with a quadrant-based viscoelastic window, generally referred to as the 'Chang window', which categorizes pressure sensitive adhesives into four main types of non-PSAs, which have high G' and low G",
quick and cold stick (low temperature) PSAs, which have low G' and high G",
removable PSAs, which have low G' and low G", and
high shear PSAs, which have high G' and high G".

The term 'water-based PSA' refers to a PSA which is produced as water based dispersion, which dispersion can be coated on a substrate and then dried to become pressure sensitive adhesive. In a water-based PSA, water therefore acts as a carrier. Adhesive labels comprising water-based PSA layers are a dominating form of labels in the label advertising industry. An important aspect when developing a water-based PSA composition is the machine coatability of the aqueous dispersion containing the PSA. Machine coatability is generally achieved by adding surfactant to the adhesive composition. An example of a common and low cost surfactant has for a long time been alkyl phenol ethoxylate, commonly denoted as APEO, which has excellent emulsifying and dispersing characteristics. The term 'APEO' refers to a group of non-ionic surfactants which comprise an alkylphenol group, such as nonylphenol or octylphenol group, attached to an ethylene oxide chain. Experimental studies have, however, shown that APEO containing products are toxic to aquatic organisms and an endocrine-disruptor to higher animals. Due to a significant environmental and health risk, APEO containing products are no longer allowed in many countries, such as in the member states of the European Union.

In addition to the adhesive properties and regulation of chemical substances as such, environmental awareness also imposes further requirements to the label. Labeling is globally a very large business. A manufactured label is typically sold to a vendor, who in many cases may send it forward to an end user. Since a considerable proportion of the labels used for label advertisement may remain unused or be discarded, the labels need to be supplied such that they can be appropriately disposed of. This means a label which is both easy to adhere on an object surface and also recycling compatible.

A large part of the labels in the label advertisement sector are adhered on paper products. Paper may be used to produce recycled cellulose fibers, denoted as 'recovered pulp' or 'recycled pulp'. Paper products are therefore recycled to a large extent. A paper recycling process involves mechanical disintegration of the paper products that is aided with water and chemicals. When paper is disintegrated with water, a pulp slurry is formed, which may be de-inked and screened mechanically with sieves. A label comprising a paper face layer may be disintegrated, such that the cellulose fibred of the face layer may be recycled. While it is also possible to separate adhesive layer residues from the paper recycling process by means of mechanical screening, it has been observed that this is technically applicable and economically profitable only when the adhesive layer remains in sufficiently large fragments. A mechanical screening of adhesive layer residues at a deinking plant is typically based on screening slots having a minimum grid size of 2000 micrometers. While a deinking plant may use multiple screening slots with varying grid sizes, the screening method limits the removability of adhesive layer residues from the pulp slurry. Due to the high amount of removable PSA labels used on paper products, many paper products may still contain labels and/or PSA adhered to the surface (or even as independent misplaced items) upon introduction of the recyclable paper products into a paper recycling process. PSA contamination is a major technical challenge which limits the use of recycled pulp. An excess amount of adhesive layer residues in the recycled pulp, in particular those having a particle size less than 2000 micrometers, may cause problems on a paper mill and/or reduce the quality of paper produced of recycled pulp. The adhesive layer fragments which may be found in a pulp slurry are generally referred to as "stickies" by paper manufacturers. A "macrosticky" refers to an adhesive layer fragment having a particle size less than 2000 micrometers.

To standardize the evaluation of recycling compatibility of adhesive containing materials, the European Paper Recycling Council (EPRC) has therefore developed a specific test, denoted as the Assessment of printed Product Recyclability (15 Mar. 2018), applicable to all kinds of printed paper products containing adhesive layers, which deals with the fragmentation of the adhesive layers and their removability by a laboratory screening process. The assessment provides a Removal Score that illustrates the screenability of the tested adhesive layer. The test is based on particle size class distribution of an adhesive layer after disintegration of the adhesive layer according to INGEDE Method 12 (January 2013), which simulates unit operations of a deinking plant. The EPRC Removal Score is rapidly becoming a minimum qualification requirement for adhesive layer compositions.

Due to the increasing regulatory demands and environmental sustainability requirements, manufacturers therefore need to develop novel labels, which are at the same time easily attachable on various products, safe to use and compatible with a paper recycling process. Further, both the label manufacturing method and the recycling of the label should be viable in an industrial scale. The task is not straight-forward, since these aspects relate to different time points of the label lifecycle. The behavior of a PSA layer at a deinking plant during paper recycling process is not easy to predict from the properties of a composition to be used as a pressure sensitive adhesive. Nonetheless, the regulatory demands and environmental sustainability requirements need to be met at these various surroundings which the label will be exposed to during its lifetime.

SUMMARY

The aforementioned problems may be solved by innovative design of a label containing a paper face layer compatible with a layer of pressure sensitive adhesive composition, which composition facilitates adhesive coating on a release liner and adherence of the composition to the paper face layer during the label manufacturing, the composition further configured to possess viscoelastic properties suitable for an advertisement label and finally, preferred fragmentation behaviour when entering a paper recycling process.

Accordingly, there is provided a label comprising a pressure sensitive adhesive layer, wherein the pressure sensitive adhesive layer has a sufficient coat weight and a composition that has been selected to comprise water-dispersible acrylate polymer, such that the composition has high shear, high loss modulus G" and high storage modulus G' values, when determined at temperature of 25° C.±2° C. The selected combination provides a PSA label which is attachable on an object surface, such as paper surface, at room temperature, as required by its end use. The PSA layer is further configured to disintegrate into large fragments under aqueous conditions which simulate unit operations of a deinking plant. Advantageously, the selected combination of PSA layer composition and coat weight has a capability to resist disintegration in aqueous conditions at a temperature in the range of 40 to 55° C. present in a paper recycling process. Thus after the disintegration, the pressure sensitive adhesive layer may to a high extent remain in fragments which are easier to screen out of the pulp slurry that contains cellulose fibres. In particular, the removable label comprising the PSA layer is compatible with a paper recycling process that has been configured to use filtrate, such as paper mill first loop clear filtrate of a deinked pulp (DIP) line. Therefore, the cellulose fibers of the paper face layer may be recovered and used in recycled pulp and the adhesive layer is suitable for mechanical separation from a pulp slurry in an industrial scale, at least to an extent that residues which possibly remain in the pulp slurry no longer cause problems in the paper recycling process or later at a paper mill.

High loss modulus G" and high storage modulus G' values have conventionally been associated to high shear PSA applications. A high shear, in this context, refers to a composition that has a static shear which is equal or higher than 10000 minutes, when determined from a glass plate at a temperature of 25° C. according to FINAT test method no. 8 (9th edition, 2009). A pressure sensitive adhesive layer composition comprising water-dispersible acrylate polymer selected to have a static shear which is equal or higher than 10000 minutes, when determined from a glass plate at a temperature of 25° C. according to FINAT test method no. 8 (9th edition, 2009), a loss modulus G" and a storage modulus G' which are higher than 50000 Pascal, when determined at a temperature of 25° C., and wherein the ratio of the loss modulus G" to the storage modulus G', referred to as tan δ, is less than 0.56, when determined with parallel plates geometry of 8 mm diameter and a gap of 1 mm, at 0.5% strain, at 1 Hz frequency, under temperature ramp having a linear rate of 2° C./min in a temperature range of −45° C. to 100° C., in accordance with modified ISO standard 6721-10 (version 2015), surprisingly demonstrates cohesive strength and tack value which are suitable for attachment on a various object surfaces, in particular paper, such that a label comprising such PSA layer composition adheres to both a paper face layer and to a paper product and does not come off prematurely.

A tack value suitable for attachment on a paper product refers to a PSA layer composition comprising water-dispersible acrylate polymer, which composition, when determined from a label containing such composition as a PSA layer according to FINAT test method no. 2 (9th edition, 2009), has a peel adhesion equal to or higher than 3 Newton from a glass plate and/or a peel adhesion equal to or higher than 2 Newton from a HDPE plate. Thus, the PSA label may be removably attachable on some object surfaces. The PSA label may be removably attachable, for example on a surface such as glass or polymer, such as polypropylene or high density polyethylene (HDPE).

Referring to the PSA layer composition above, the composition may comprise emulsion polymerized, water-dispersible acrylate polymer. The emulsion polymerized, water-dispersible acrylate polymer may be formed of monomers. The monomers may comprise soft, hard or functional monomers or any combination of these monomers. These monomers may be emulsified to produce an adhesive layer composition having high cohesive strength and/or low tack. Thus, the adhesive layer composition may be configured to comprise a PSA layer having high cohesive strength and low tack. High cohesive strength and low tack have been observed to promote adherence of the label to the object surface and correlate with resistance to fragmentation in paper recycling process conditions. In this context, a soft monomer refers to a monomer which, when determined from a homopolymer of such monomers, has a glass transition temperature below −40° C. Examples of such monomers are 2-ethylhexyl acrylate, n-butyl acrylate and iso-octyl acrylate. In this context, a hard monomer refers to a monomer which, when determined from a homopolymer of such monomers, has a glass transition temperature above 30° C. Examples of such monomers are methyl methacrylate, vinyl acetate and styrene. Preferably, however, the emulsion polymerized, water-dispersible acrylate polymer has been formed of monomers without vinyl acetate. A water-dispersible acrylate polymer comprising vinyl acetate in its structure may be prone to fragmentation in paper recycling process conditions. The increased fragmentation tendency may be present even at higher amounts of adhesive coat weight.

The adhesive layer composition may comprise emulsion polymerized, water-dispersible acrylate polymer that has functional groups in the polymer structure. Functional monomers may be emulsified into the polymer structure to enhance the recycling compatible properties of the adhesive layer. A functional monomer refers in this context to a monomer, which may be used for stabilizing the acrylate polymer dispersion. Functional monomers may be arranged to provide a PSA polymer chain containing one or more functional groups, which enable chemical reactions to take place. An example of such chemical reaction is the cross-linking of an acrylate polymer. The cross-linking of an acrylate polymer decreases the solubility of the polymer to solvents like tetrahydrofuran, which may be determined by gravimetric means using a Soxhlet extractor. The tetrahydrofuran soluble fraction of may be further used for molecular weight analysis by means of gel permeation chromatography according to standard CEN/TS 14577 (2003). Gel permeation chromatography is a variant of high-pressure liquid chromatography, which is widely used technique in the art. The insoluble mass fraction of a composition comprising water-dispersible acrylate polymer to tetrahydrofuran correlates with the resistance to fragmentation in paper recycling process conditions. Advantageously, the composition has a tetrahydrofuran insoluble mass fraction which is to is equal to or higher than 65 wt.-%, such as in the range of 65 to 75 wt.-%. Examples of functional monomers are acrylic acid, methacrylic acid, maleic acid and acrylamide. Advantageously, the emulsion polymerized, water-dispersible acrylate polymer comprises methacrylic acid. Preferably, the emulsion polymerized, water-dispersible acrylate polymer is a copolymer comprising acrylic acid and methacrylic acid.

The tetrahydrofuran insoluble mass fraction of the composition, and thereby the resistance to fragmentation in paper recycling process conditions, is also related to the molecular weight and polydispersity of the composition. Preferably, the PSA composition is selected to comprise a moderate molecular weight and polydispersity, such as a number average molecular weight $M_n$ equal to or less than 45000 g/mol, preferably in the range of 35000-45000 g/mol, and/or a mass average molecular weight $M_w$ equal to or less than 175000 g/mol, preferably in the range of 145000-175000 g/mol, and/or a polydispersity $M_w/M_n$ between 2 and 4 preferably between 3 and 4, when determined from a tetrahydrofuran soluble fraction by means of gel permeation chromatography in accordance with standard CEN/TS 14577 (2003).

The composition may be without alkyl phenol ethoxylates, when a non-ionic copolymer based on polyethylene glycol and polypropylene glycol is used together with the water-dispersible acrylate polymer to promote the coatability of the composition as an aqueous dispersion. Preferably, the non-ionic copolymer based on polyethylene glycol and polypropylene glycol is a difunctional block copolymer terminating in primary hydroxyl groups. A difunctional block copolymer terminating in primary hydroxyl groups may improve the wetting and dispersing properties of the acrylate polymer dispersion. The wetting and dispersing properties of the acrylate polymer dispersion are important aspects of the machine coatability of the composition.

Referring to the adhesive layer composition disclosed above, the adhesive layer coat weight has been observed to correlate with resistance to fragmentation in paper recycling process conditions. Thus, a combination of adhesive layer composition and coat weight may be used to control the recycling compatibility of a removable label in a paper recycling process. In particular, a coat weight equal to or higher than 10 g/m$^2$, when determined as dry adhesive from the label, has the effect of preserving the adhesive layer in larger fragments, when determined after disintegration of the label according to INGEDE Method 12 (2013) for PSA applications. The ability to control the adhesive layer fragmentation such that the fragmentation results into a weighed distribution having larger particles, such as adhesive particles above a particle size of 2000 μm, may be demonstrated with a parameter referred to as '$S_{2000}$' in the INGEDE Method 12. The $S_{2000}$ value represents the share of disintegrated adhesive layer area of fragments having a particle size less than 2000 μm identical equivalent circle diameter. Thus, a small $S_{2000}$ value indicates a low total area of particles having less than 2000 μm equivalent circle diameter, which particles originate from the adhesive layer. The $S_{2000}$ parameter therefore is a measure of the screening ability limit of the PSA label, with respect to adhesive particles having less than 2000 μm equivalent circle diameter produced during disintegration of the label in conditions used in a paper recycling process. Advantageously, the removable label has a $S_{2000}$ value equal to or less than 23 mm$^2$/kg, preferably equal to or less than 15 mm$^2$/kg, most preferably equal to or less than 12 mm$^2$/kg.

According to a first aspect, there is provided a recycling compatible label, the label comprising a face layer and a pressure sensitive adhesive layer attachable to a paper surface, the adhesive layer having a coat weight equal to or higher than 10 g/m$^2$, when determined as dry adhesive from the label according to FINAT test method no. 12 (9th edition, 2009), wherein the adhesive layer has a composition which is free of alkylphenol ethoxylate and has been selected to comprise emulsion polymerized, water-dispersible acrylate polymer, and non-ionic copolymer based on polyethylene glycol and polypropylene glycol, such that the composition has a tetrahydrofuran insoluble mass fraction which is to is equal to or higher than 65 wt.-%, when determined by gravimetric means using a Soxhlet extractor, a static shear which is equal or higher than 10000 minutes, when determined from a glass plate at a temperature of 25° C. according to FINAT test method no. 8 (9th edition, 2009), a loss modulus G" and a storage modulus G' which are higher than 50000 Pascal, when determined at a temperature of 25° C., and wherein the ratio tan δ of the loss modulus G" to the storage modulus G' is less than 0.56, when determined with parallel plates geometry of 8 mm diameter and a gap of 1 mm, at 0.5% strain, at 1 Hz frequency, under temperature ramp having a linear rate of 2° C./min in a temperature range of −45° C. to 100° C., in accordance with modified ISO standard 6721-10 (version 2015), such that after disintegration of the label according to INGEDE Method 12 (2013) for PSA applications, the label is recycling compatible, when determined according to the European Paper Recycling Council Assessment of Printed Product Recyclability (15 Mar. 2018). Advantageously, the recycling compatibility of the label is determined as a $S_{2000}$-value obtainable after disintegration of the label, according to INGEDE Method 12 (2013) for PSA applications. Most advantageously, after disintegration of the label according to INGEDE Method 12 (2013) for PSA applications, the label has a Removal Score which is equal to or higher than 51 points, when determined according to the European Paper Recycling Council Assessment of Printed Product Recyclability (15 Mar. 2018).

According to a second aspect, there is provided a method for producing a label, the method comprising steps of providing a composition which is suitable for use as a pressure sensitive adhesive, wherein the composition
is free of alkylphenol ethoxylate and
has been selected to comprise
emulsion polymerized, water-dispersible acrylate polymer, and
non-ionic copolymer based on polyethylene glycol and polypropylene glycol,
such that the composition has
a tetrahydrofuran insoluble mass fraction which is to is equal to or higher than 65 wt.-%, when determined by gravimetric means using a Soxhlet extractor,
a static shear which is equal or higher than 10000 minutes, when determined from a glass plate at a temperature of 25° C. according to FINAT test method no. 8 (9th edition, 2009),
a loss modulus G" and a storage modulus G' which are higher than 50000 Pascal, when determined at a temperature of 25° C., and wherein
the ratio tan δ of the loss modulus G" to the storage modulus G' is less than 0.56, when determined with parallel plates geometry of 8 mm diameter and a gap of 1 mm, at 0.5% strain, at 1 Hz frequency, under temperature ramp having a linear rate of 2° C./min in a temperature range of −45° C. to 100° C., in accordance with modified ISO standard 6721-10 (version 2015), applying an amount of the composition as aqueous dispersion on a release liner, thereby forming a pressure sensitive adhesive layer, and adjoining a face layer to the pressure sensitive adhesive layer, thereby providing the recycling compatible label, wherein the amount of the composition applied corresponds to a coat weight equal to or higher than 10 g/m², when determined as dry adhesive from the label according to FINAT test method no. 12 (9th edition, 2009), such that after disintegration of the label according to INGEDE Method 12 (2013) for PSA applications, the label is recycling compatible, when determined according to the European Paper Recycling Council Assessment of Printed Product Recyclability (15 Mar. 2018). Advantageously, the recycling compatibility of the label is determined as a $S_{2000}$-value obtainable after disintegration of the label, according to INGEDE Method 12 (2013) for PSA applications. Most advantageously, after disintegration of the label according to INGEDE Method 12 (2013) for PSA applications, the label has a Removal Score which is equal to or higher than 51 points, when determined according to the European Paper Recycling Council Assessment of Printed Product Recyclability (15 Mar. 2018).

According to a third aspect, there is provided a use of a composition as a pressure sensitive adhesive layer of a recycling compatible label having a coat weight equal to or higher than 10 g/m² of dry adhesive, when determined according to FINAT test method no. 12 (9th edition, 2009), wherein the composition
is free of alkylphenol ethoxylate and
has been selected to comprise
emulsion polymerized, water-dispersible acrylate polymer, and
non-ionic copolymer based on polyethylene glycol and polypropylene glycol,
such that the composition has
a tetrahydrofuran insoluble mass fraction which is to is equal to or higher than 65 wt.-%, when determined by gravimetric means using a Soxhlet extractor,
a static shear which is equal or higher than 10000 minutes, when determined from a glass plate at a temperature of 25° C. according to FINAT test method no. 8 (9th edition, 2009),
a loss modulus G" and a storage modulus G' which are higher than 50000 Pascal, when determined at a temperature of 25° C., and wherein
the ratio tan δ of the loss modulus G" to the storage modulus G' is less than 0.56, when determined with parallel plates geometry of 8 mm diameter and a gap of 1 mm, at 0.5% strain, at 1 Hz frequency, under temperature ramp having a linear rate of 2° C./min in a temperature range of −45° C. to 100° C., in accordance with ISO standard 6721-10 (version 2015).

Preferably, the composition disclosed above comprises
emulsion polymerized, water-dispersible acrylate polymer comprising methacrylic acid, acrylic acid, 2-ethylhexyl ester, acrylonitrile, N-methylolacrylamide, acrylamide and formaldehyde, and
non-ionic copolymer based on polyethylene glycol and polypropylene glycol.

Advantageously, the recycling compatibility of the label, may be determined as an $S_{2000}$ value of the INGEDE Method 12 (2013). The $S_{2000}$ value represents the share of disintegrated adhesive layer area of fragments having a particle size less than 2000 μm identical equivalent circle diameter. In other words, The $S_{2000}$ value is an indication of the amount of residues which originate from the adhesive layer after disintegration of the label according to INGEDE Method 12 (2013) for PSA applications, which residues have a particle size between 100 and 2000 micrometres. Therefore, the $S_{2000}$ value is a direct indication of the recycling compatibility of a label at a deinking plant having a grid size of 2000 micrometer or larger. The $S_{2000}$ value is used to determine a Removal Score according to the European Paper Recycling Council Assessment of Printed Product Recyclability (15 Mar. 2018).

Since the results obtained according to INGEDE Method 12 (2013) are converted into a Removal Score, the recycling compatibility of the label may also be expressed as a Removal Score according to the European Paper Recycling Council Assessment of Printed Product Recyclability (15 Mar. 2018) after disintegration of the label according to INGEDE Method 12 (2013) for PSA applications. A label determined to have a negative Removal Score (less than 0) is given a grade "Insufficient". A label determined to have a positive Removal Score (equal to or higher than 0) may be given a grade "Sufficient", and may therefore be referred to as recycling compatible. A label determined to have a Removal Score in the range of 0 to 50 points is given a grade "Tolerable". A label determined to have a Removal Score in the range of 51 to 70 points is given a grade "Fair", whereas a label which receives a Removal Score in the range of 71 to 100 points is given a grade "Good". Therefore, a higher Removal Score value correlates with improved recycling compatibility. Advantageously, a recycling compatible label is a label which receives a Removal Score that is equal to or higher than 51 points, more preferably equal to or higher than 71 points. A recycling compatible label therefore may have a Removal Score that is in the range of 0 to 100 points, more preferably in the range of 51 to 100 points, most preferably in the range of 71 to 100 points. The Removal Score assessment refers to complete printed products, disregarding which number and type of adhesive applications it contains. For a label comprising a PSA layer composition comprising emulsion polymerized, water-dispersible acrylate polymer, it has been observed that most advantageously, the recycling compatibility is determined as a combination of the $S_{2000}$ value and the Removal Score. This combination provides both a more general assessment of the recyclability of the label, as well as a more detailed determination of the removability of the PSA layer composition from the paper recycling process.

The following detailed description, together with FIGS. 1-8 and experimental results, illustrates various aspects of the invention and characterizes the properties of the recycling compatible label. In the Figures, SX and SZ denote orthogonal directions.

DETAILED DESCRIPTION

A Pressure Sensitive Adhesive Label

Figure 1:
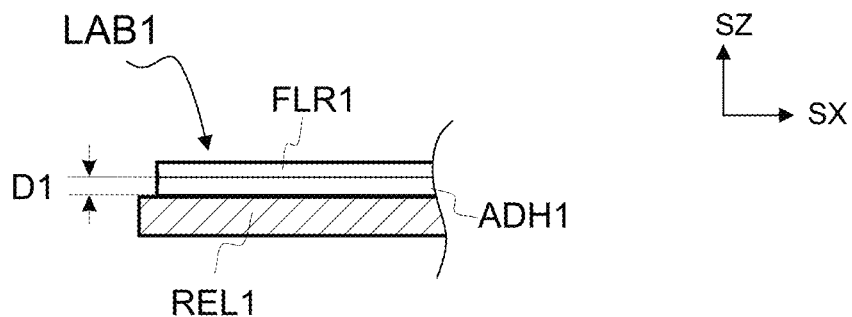
FIG. 1 illustrates, by way on an example, a method to manufacture a label.

A 'label' refers to an information carrier or an object which may be affixed to a product. A label may be arranged to contain written or printed information or symbols on one or both sides of the face layer. An adhesive label may be manufactured on a release liner. An adhesive label contains a face layer and an adhesive layer. The face layer of a recycling compatible label is of paper that contains cellulose fibers. A paper face layer is advantageous for recycling compatibility, since such face layer may be recycled, at least to some extent, to produce recycled cellulose fibers. A release liner is typically a product having a dehesive surface, referred to as a release layer. The release layer is used to provide stable release properties of the removable PSA label from the dehesive release liner. A typical release layer may comprise a silicone based polymer structure. The release liner may comprise a paper substrate layer that contains cellulose fibers. A release liner comprising paper is advantageous for recycling compatibility, since it may be recycled, at least to some extent, to produce recycled cellulose fibers.

The paper face layer requires suitability for printing. The paper face layer may be of uncoated paper. Uncoated paper is in general inexpensive and therefore provide excellent value in larger volumes, such as in retail information labeling. Advantageously, the paper face layer may be of coated paper. Examples of coated papers are gloss paper and top coated paper. Coated papers may be used for a range of more specific printing applications, such as thermal transfer printing, dot-matrix printing, UV and water-based flexography printing, UV-letterpress printing or offset printing. Advantageously, the paper face layer does not contain water-soluble binder. A paper face layer comprising water-soluble binder may soften or delaminate upon label manufacturing, which may render the label unsuitable for the end application. Typical parameter values for a paper which is suitable for use as a face layer of a recycling compatible label are:

- substance in the range of 60 to 80 g/m$^2$ (standard ISO 536),
- caliper in the range of 60 to 80 micrometers (standard ISO 534),
- tensile strength MD in the range of 4.5 to 6 kN/m (standard ISO 1924/1),
- tensile strength CD in the range of 2.5 to 3 kN/m (standard ISO 1924/1), and/or
- roughness in the range of 1 to 3 micrometers (standard ISO 8791)

Preferably, the paper face layer is not of wet strength paper. Examples of wet strength paper is filter paper, which requires resistance to disintegration, when the paper is wet. The wet strength of a paper is therefore a measure of how well the web of fibers holding the paper together resist a force of rupture when the paper is wet. Wet strength is measured as the ratio of wet to dry tensile force at break. A paper having a ratio of wet to dry tensile force at break, which is in the range of 0.1 to 0.3, is generally considered to be wet strength paper. Properties of a label and/or of a PSA layer may be determined by using standardized test methods, such as described in the FINAT technical handbook comprising test methods for self-adhesive materials (9th edition, year 2014). Numerical values characterizing the properties of a label and/or of a PSA layer refer to values obtained by said methods, unless otherwise specified.

Properties of a PSA layer composition may be determined by using standardized test methods, such as described in the ISO standard 6721-10 (year 2015) and the CEN/TS standard 14577 (year 2003). Numerical values characterizing the properties of a PSA layer composition refer to values obtained by said methods, unless otherwise specified.

Recycling compatibility of a label and/or of a PSA layer may be determined by using standardized test methods, such as described by the International Association of the Deinking Industry, referred to as INGEDE methods (year 2013), and the European Paper Recycling Council Assessment of Printed Product Recyclability, referred to as EPRC Scorecard (15 Mar. 2018). Numerical values characterizing the recycling compatibility of a label and/or of a PSA layer refer to values obtained by said methods, unless otherwise specified.

Reference is made to FIG. 1. A label LAB1 may be manufactured and arranged on a release liner REL1 by
providing a composition which is suitable for use as a PSA,
applying an amount of the composition as aqueous dispersion on a release liner, thereby forming a PSA layer ADH1 having a thickness D1, wherein the thickness D1 corresponds with the coat weight in grams per square meter ($g/m^2$) of dry adhesive, when determined according to FINAT test method no. 12 (9th edition, 2009), and
adjoining a face layer FLR1 to the PSA layer ADH1, thereby providing the label LAB1.

Adhesive Layer Composition

Adhesion of an adhesive depends on the type of the adhesive and the used surface material. Pressure sensitive adhesives are typically soft elastomer-based solutions that are highly viscous and sticky to the touch. A label containing a PSA layer, also referred to as a 'PSA label', is therefore self-adhering upon labelling and may be used without a solvent, water, or heat to activate the adhesive.

A pressure sensitive adhesive layer composition, in this context, is self-adhering and may be used without a solvent, water, or heat to activate the adhesive layer composition. Composition of a pressure sensitive adhesive layer in this context refers to an adhesive composition, which has a tendency to adhere towards an adhesion surface when pressure is applied on the adhesive layer. A permanent pressure sensitive adhesive layer may be attached to an adhesion surface, such as a paper. A removable pressure sensitive adhesive layer may further be removed from the adhesion surface, such as a paper. The adhesion surface may also be of other materials, for example glass or polymer. A water-based PSA refers to a polymer composition which has been formulated to act as pressure sensitive adhesive, and which may be applied on a release liner as an aqueous dispersion comprising adhesive particles. When the applied aqueous dispersion begins to dry, the adhesive particles undergo a film-forming mechanism and form a closely packed layer, which becomes the adhesive layer. An aqueous dispersion of polymeric particles that is employed to produce an adhesive composition may also be referred to as a latex.

Advantageously, to obtain a recycling compatible, high shear PSA composition attachable to an object surface at room temperature, the PSA composition may be selected to comprise acrylate polymer, which may also be referred to as acrylic or polyacrylate. Acrylate polymer may be formed of acrylate monomers.

Acrylate monomers in this context refer to acrylic acid or its derivatives and their salts, esters and conjugate bases. Non-limiting examples of acrylate monomers are acrylic acid, methacrylic acid, methyl methacrylic acid, 2-ethylacrylic acid, methacrylate, methyl methacrylate, methyl acrylate, ethyl acrylate, 2-ethylhexyl acrylate, hydroxyethyl methacrylate, 2-ethylhexyl acrylate, butyl acrylate, butyl methacrylate, n-butyl acrylate and iso-octyl acrylate. Preferably, the acrylate polymer is formed of relatively polar monomers such that the formed polymer is water-dispersible. Water dispersibility enables the viscosity of the acrylate polymer to be adjusted. An adhesive composition comprising water-dispersible acrylate polymer refers in this context to a composition which may be applied by conventional industrial coating methods, such as by transfer coating or gravure coating methods.

The water-dispersible acrylate polymer may be emulsion polymerized. Emulsion polymerized, in this context, refers to an acrylate polymer product that has been obtained via radical polymerization reaction in an emulsion comprising water, monomers, and non-ionic surfactant. The emulsion polymerized, water-dispersible acrylate polymer may be selected from acrylic homopolymers, vinyl/acrylic copolymers, styrene/acrylic copolymers, vinyl homopolymers and styrene homopolymers or it may be any combination thereof.

Advantageously, the water-dispersible acrylate polymer is a colloidal dispersion, wherein the acrylate polymer forms coiled polymer chains having high molecular weight surrounded by the non-ionic surfactant. Advantageously, the emulsion polymerized, water-dispersible acrylate polymer is a copolymer comprising acrylic acid and methacrylic acid. Methacrylic acid may be employed in emulsion polymerization to provide electrostatic colloidal stability. Acrylic acid and methacrylic acid may further influence the packing of the colloidal particles, when the composition comprising the emulsion polymerized, water-dispersible acrylate polymer is coated on a release liner to form the pressure sensitive adhesive layer.

Acrylate monomers that are used in emulsion polymerization of an acrylate polymer may comprise soft monomers, hard monomers, functional monomers or any combination of these. Soft monomers refer to substances that in the polymerized form promote the viscose characteristics of the pressure sensitive adhesive composition, such that the composition is able to flow. Soft monomers, when determined from a homopolymer of such monomers, have a glass transition temperature below −40° C. Hard monomers refer to substances that in the polymerized form promote the elastic characteristics of the pressure sensitive adhesive composition, such that the composition has cohesive strength. Hard monomers, when determined from a homopolymer of such monomers, have a glass transition temperature above 30° C. Functional monomers refer to substances that in the polymerized form promote the stability of the pressure sensitive adhesive composition or enables chemical reactions to take place by providing a polymer chain containing one or more functional groups. Preferably, the emulsion polymerized, water-dispersible acrylate polymer is a copolymer comprising acrylic acid and methacrylic acid. Advantageously, the emulsion polymerized, water-dispersible acrylate polymer is a copolymer comprising methacrylic acid, acrylic acid, 2-ethylhexyl ester, acrylonitrile, N-methylolacrylamide, acrylamide and formaldehyde. The relative proportion of the hard monomers, soft monomers and functional monomers in the emulsion polymerized, water-dispersible acrylate polymer may be used to adjust the properties of the composition, such as the shear, loss modulus G" and/or storage modulus G' levels.

The water-dispersible acrylate polymer is the main component of the adhesive layer composition. The amount of water-dispersible acrylate polymer in the adhesive layer composition may be equal to or higher than 90 wt.-%, when calculated from the total weight of the adhesive layer composition. Preferably, the amount of water-dispersible acrylate polymer in adhesive layer composition is equal to or higher than 92 wt.-%, more preferably equal to or higher than 94 wt.-%, most preferably equal to or higher than 96 wt.-%, when calculated from the total weight of the adhesive layer composition.

Pressure sensitive adhesive compositions typically comprise highly viscoelastic polymers or polymer solutions, which may be configured to interact with wetting liquids, such as non-ionic surfactants. The adhesive layer composition may therefore further comprise a surfactant to promote the emulsifying and dispersing characteristics of the composition. The adhesive layer composition may comprise a non-ionic surfactant to promote the coatability of the composition as an aqueous dispersion. Preferably, the adhesive layer composition may comprise a non-ionic copolymer based on polyethylene glycol and polypropylene glycol. A non-ionic copolymer based on polyethylene glycol and polypropylene glycol may be used to influence the particle size distribution and the colloidal stability of the adhesive layer composition. Preferably, the non-ionic copolymer based on polyethylene glycol and polypropylene glycol is a difunctional block copolymer terminating in primary hydroxyl groups. A difunctional block copolymer terminating in primary hydroxyl groups may improve the wetting and dispersing properties of the acrylate polymer dispersion. The amount of non-ionic surfactant in the adhesive layer composition may be equal to or less than 10 wt.-%, when calculated from the total weight of the adhesive layer composition. Preferably, the amount of non-ionic surfactant is equal to or higher than 5 wt.-%, more preferably equal to or higher than 2 wt.-%, most preferably equal to or higher than 1 wt.-%.

Characterization of the Adhesive Layer Composition

The viscoelastic properties, static shear, peel resistance, tack value, tetrahydrofuran insoluble mass fraction and molecular weight distribution of the pressure sensitive adhesive composition may be used to define the adherence and recycling compatibility of the PSA layer composition. These are properties which may be used to define the PSA layer composition that can be fragmented into larger fragments upon subjecting the PSA layer to paper recycling process conditions. These properties may also be determined from an adhesive layer composition by standardized test methods.

In the following, experimental test results are presented which characterize a recycling compatible label comprising a pressure sensitive adhesive layer composition in more detail. The experimental tests were performed for pressure sensitive adhesive layer compositions S1, S2 and S3 in the form of an aqueous dispersions. The PSA layer compositions S1, S2 and S3 were free of alkylphenol ethoxylate and selected to comprise emulsion polymerized, water-dispersible acrylate polymer and non-ionic copolymer based on polyethylene glycol and polypropylene glycol. The composition S1 comprised 96.7 wt.-% of emulsion polymerized, water-dispersible acrylate polymer comprising methacrylic acid, acrylic acid, 2-ethylhexyl ester, acrylonitrile, N-methylolacrylamide, acrylamide and formaldehyde, and 0.77 wt.-% of non-ionic copolymer based on polyethylene glycol and polypropylene glycol, the remaining residual amount up to 100 wt.-% comprising water (2.34 wt-%), foam control agent (0.12 wt.-%) and ammonia solution 25% from Sigma-Aldrich (0.06 wt.-%).

Variations of the pressure sensitive adhesive layer composition S1, denoted as composition S2 and S3, were included in some of the experimental tests. Altered viscoelastic properties may be obtained, for example, by amending the proportion of the acrylate monomers, such as a the ratio of acrylic acid to methacrylic acid, in the emulsion polymerization of water-dispersible acrylate polymer or by altering the molecular weight distribution of the composition with the non-ionic surfactant. Table 1 (below) presents the amounts of emulsion polymerized, water-dispersible acrylate polymer and non-ionic copolymer used in each composition S1, S2 and S3.

The experimental results were compared to those obtainable from conventional adhesive compositions, which were not recycling compatible, when determined according to the European Paper Recycling Council Assessment of Printed Product Recyclability (15 Mar. 2018). The conventional adhesive compositions used for comparison were:

composition C1 a permanent water dispersible acrylic polymer commercial adhesive for general purposes composition C2 a permanent water dispersible acrylic polymer tack 10 N, when determined according to FTM9 composition C3 a permanent rubber polymer, hot melt tack 12 N, when determined according to FTM9 composition C4 a water dispersible permanent acrylic polymer tack 18 N, when determined according to FTM9 composition C5 a UV radiation curable acrylic polymer tack 11 N, when determined according to FTM9

Adhesive Tack Value

The adhesion strength of a pressure sensitive adhesive layer towards the surface develops as a function of time, referred to as an adhesive set-up time. For example, a sufficient strength of the bond between the label and the package may be attained almost immediately when pressing, within minutes or within half an hour after the adhesive is brought into contact with the paper product surface.

The adhesive layer strength may be expressed by a tack value, as described above. A pressure sensitive adhesive composition suitable for attachment on a paper product requires a relatively low tack value. A low tack value is beneficial in situations wherein removability is desired, such that the paper is not damaged upon removal of the label from the paper product. However, the tack value should be sufficient, such that label is not detached prematurely from the paper product. The tack value may be determined according to a FINAT test method (9th edition, 2009) for loop tack measurement, referred to as FTM9.

TABLE 1

Amounts of emulsion polymerized, water-dispersible acrylate polymer and non-ionic copolymer based on polyethylene glycol and polypropylene glycol used in each composition S1, S2 and S3 and the tack an peel values determined from the compositions.

| PSA layer composition | S1 | S2 | S3 |
|---|---|---|---|
| Polymer (wt.-%) | 96.70 | 96.60 | 96.40 |
| Surfactant (wt.-%) | 0.77 | 0.84 | 1.09 |
| FTM9 - Average tack from glass (N) | 9.4 | 5.9 | 5.1 |
| FTM2 - Average peel (90°) from glass after 20 min (N) | 5.1 | 2.9 | 2.9 |
| FTM2 - Average peel (90°) from cardboard after 20 min (N) | 1.3 | 0.5 | 0.7 |
| FTM2 - Average peel (90°) from HDPE after 20 min (N) | 3.8 | 2.0 | 2.5 |

As can be observed from Table 1, the compositions S1, S2 and S3 differed in their tack values. Based on the experimental results, the average tack value of a recycling compatible label comprising a pressure sensitive adhesive layer composition may be equal to or less than 10N, preferably equal to or less than 9.5 N such as in the range of 5 to 10 N, when determined from a glass plate.

In other words, a removable label suitable for removable attachment on a paper product may comprise a pressure sensitive adhesive layer having a loop tack value of 10 Newton or less, preferably 8 Newton or less, most preferably 7 Newton or less, such as in the range of 6 to 10 Newton, when determined according to FINAT test method no. 9 (9th edition, 2009). Preferably, the tack value is equal to or higher than 5 Newton, to provide sufficient adherence of the pressure sensitive adhesive layer towards a paper product.

As can be further observed from Table 1, the compositions S1, S2 and S3 differed in their peel values. Based on the experimental results, the average peel value of a recycling compatible label comprising a pressure sensitive adhesive layer composition may be higher than 2.9 N, preferably equal to or higher than 5 N such as in the range of 3 to 6 N, when determined from a glass plate. Based on the experimental results, the average peel value of a recycling compatible label comprising a pressure sensitive adhesive layer composition may be higher than 0.7 N, preferably equal to or higher than 1 N such as in the range of 0.8 to 1.5 N, when determined from a cardboard plate. Based on the experimental results, the average peel value of a recycling compatible label comprising a pressure sensitive adhesive layer composition may be higher than 2.5 N, preferably equal to or higher than 3 N such as in the range of 2.6 to 4 N, when determined from a HDPE plate.

Adhesive Application Temperature

The temperature range wherein the adhesive may adhere to the surface is referred to as the service temperature of the adhesive. A pressure sensitive label which is intended to be used as an advertisement label on various object surfaces such as papers may have a minimum service temperature of 0° C. or higher. A pressure sensitive label which is intended to be used as an advertisement label on various object surfaces such as papers may have a maximum service temperature of 70° C. or lower. A pressure sensitive label which is intended to be used as an advertisement label on various object surfaces such as papers may adhere to the object surface, for example in the range of 0° C. to 70° C., preferably in the range of 5° C. to 60° C., most preferably in the range of 10° C. to 50° C.

T-Peel Test (180°)

In a comparative experimental test, the peel resistance of the adhesive layer composition S1 was measured to conventional adhesive layer compositions C1-C5. The peel resistance was used to assess the cohesive strength of the adhesive layer compositions.

The permanence of adhesion may be characterized by a peel adhesion test using a 180° according to modified FINAT test method no. 1 (9th edition, 2009). In the standard version of this peel test, the force required to remove pressure sensitive coated material, which has been applied to a standard glass test plate, is measured. The tests were done with a Shimadzu EZ-LX tensile tester, using the tester according to the instruction manual provided by the manufacturer.

Due to the removable characteristics of the adhesive layer composition S1 towards a polymer (PET) film, the peel adhesion test was modified. The deviation from the standard peel adhesion test as disclosed in the F™1 was that instead of a standard glass test plate, the adhesive layer composition was first adhered to a paper face layer from both sides, such that the adhesive layer composition was between two paper face layers. Then each paper face layer was adhered to a polymer film (PET) by means of a second adhesive. Thus a multilayer structure was formed, that had the adhesive composition to be tested (S1, C1, C2, C3, C4 or C5) as the middle layer and paper face layers adhered to polymer film (PET) layers via second adhesive as outer layers. Each sample was prepared using the same paper face layer, same second adhesive and same polymer film. The over lamination of the paper face layer with polymer film (PET) and a second adhesive was done to enable testing of the peel resistance of the adhesive composition layer in the middle. Table 2 (below) presents the results of the thereby modified peel adhesion test (180°) after 20 minutes.

TABLE 2

Results of a peel adhesion test (180°) after 20 minutes according to modified FINAT test method no. 1 (9th edition, 2009). The values correspond to units of Newton. The marking "PT" refers to paper tear, such that the adhesive force has exceeded the strength of a paper facing material.

| Adhesive | T-peel 1 (N) | T-peel 2(N) | T-peel 3 (N) | Average T-peel (N) |
|---|---|---|---|---|
| S1 | PT | PT | PT | PT |
| C1 | 7.3 | 7.6 | 8 | 7.6 |
| C2 | 8.4 | 8.1 | 8.1 | 8.2 |
| C3 | 8.4 | 7.9 | 9.2 | 8.5 |
| C4 | 7.7 | 8.2 | 9.1 | 8.3 |
| C5 | 11.6 | 11.3 | 10.2 | 11 |

As can be seen from the results of Table 2, the adhesive composition S1 was the only composition, wherein paper tear occurred. It was not possible to determine the peel value to separate one adhesive layer from the other. Instead, in the adhesive composition S1 it was possible to measure only one amount of force which was required to peel the paper laminate from the polymer (PET) film. This leads to a conclusion that the bonds in the adhesive layer composition S1 were much higher towards paper. Based on the results, the adhesive composition S1 comprises high shear properties. When applied as an adhesive layer, the adhesive composition S1 demonstrates very high cohesive strength, which is evident based on the average T-peel values of Table 2, listing also the cohesive strength of the other adhesive compositions C1-C5.

Resistance to Shear

Figure 2:
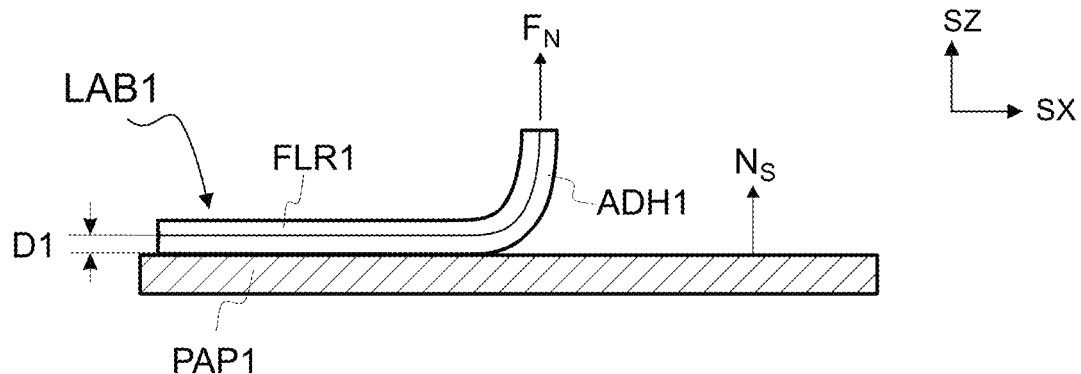
FIG. 2 illustrates, by way on an example, the detachment of a label be by a pulling force $F_N$ in a direction substantially parallel with the surface normal $N_S$ of the label.

Reference is made to FIG. 2. The detachment properties of a label LAB1 from an adhesion surface such as paper may be determined by resistance to shear. When removing the label LAB1 from a paper product PAP1 surface, the label may be pulled by a pulling force $F_N$. The pulling force $F_N$ may be used to determine the amount of force needed to detach the label LAB1 from the surface. When determining the removability of a label LAB1, the label may be pulled by a pulling force $F_N$ in a direction substantially parallel with the surface normal $N_S$ of the label LAB1, as shown in FIG. 2. A direction substantially perpendicular with the surface of the label LAB1 is the thickness direction SZ of the label LAB1. The thickness direction SZ is parallel to the thickness D1 of the adhesive layer ADH1. The adhesive layer ADH1 may be a pressure sensitive adhesive layer. When a label LAB1 and a paper product PAP1 form a combination, as shown by way of an example in FIG. 2, the pulling force $F_N$ may be used to determine the amount of force needed for pulling the label LAB1 off from the paper product PAP1. The pulling force $F_N$ may therefore be used to determine whether the label LAB1 is removable from a paper product PAP1. A pulling force $F_N$ may be used to test that the adhesive layer ADH1 is removable from the paper product PAP1 without damage to the paper product PAP1 surface. A pulling force $F_N$ may be used to test whether the adhesive layer ADH1 is attachable and removable without damaging the label LAB1 or the paper product PAP1 surface at a room temperature of 25° C.±2° C. The room temperature of 25° C.±2° C. is a typical temperature in which the label LAB1 may be applied on the paper product PAP1. The properties of the label LAB1 may be selected such that the label LAB1 is permanently attached to the object surface, when the object surface is paper. However, the properties of the label LAB1 may at the same time enable the label LAB1 to be separated from the another type of product surface in a single piece, such that the adhesive layer ADH1 and the face layer FLR1 stay together. For example, when removing the label LAB1 from a glass or a HDPE surface, the adhesive layer ADH1 may be configured to remain attached to the face layer FLR1 of the label LAB1, such that substantially no visual residues of the label LAB1 remain on the glass or the HDPE surface.

The static shear of an adhesive layer composition is the ability of the adhesive layer composition to withstand static forces applied in the same plane as the label face layer. The static shear correlates with the pulling force $F_N$, and may therefore be used to test the amount of force needed to detach the label LAB1 from the surface. Resistance to shear, measured from an adhesive layer composition, may therefore be used to determine the removable properties of the adhesive layer composition with respect to a paper product. The resistance to shear of an adhesive layer composition may be determined from a standard surface according to FINAT test method no. 8 (9th edition, 2009).

In a comparative test, resistance to shear was determined from a standard glass surface as the time required for a standard area (25 mm wide and 175 mm long) of pressure sensitive coated material to slide in a direction parallel to the surface from adhesive layer composition S1 and conventional adhesive layer compositions C1-C5. The resistance to shear of each composition was determined from a glass plate first at a temperature of 25° C. and relative humidity of 50%, according to FINAT test method no. 8 (9th edition, 2009). The resistance was thereafter determined according to a modified FINAT test method no. 8 (9th edition, 2009), wherein the test was modified such that the resistance was determined temperature of 35° C. and relative humidity of 75%. In each temperature, tree separate shear measurements (Shear 1, 2 and 3) were performed for each composition, of which the average value was calculated and represents the determined shear value of the composition at the measurement conditions. Table 3 (below) presents the results of resistance to shear at room temperature of 25° C. and relative humidity of 50% from the adhesive layer composition S1 and conventional adhesive layer compositions C1-C5. Table 4 (below) presents the results of resistance to shear from the same compositions at temperature of 35° C. and relative humidity of 75%.

TABLE 3

Static shear of adhesive layer compositions at room temperature of 25° C. and relative humidity of 50%.

| Sample | Shear 1 (minutes) | Shear 2 (minutes) | Shear 3 (minutes) | Shear average (minutes) |
|---|---|---|---|---|
| S1 | 99999* | 80652 | 99999* | 93550 |
| C1 | 178 | 160 | 129 | 156 |
| C2 | 1925 | 3820 | 2320 | 2688 |
| C3 | 485 | 485 | 664 | 545 |
| C4 | 610 | 702 | 644 | 652 |
| C5 | 1930 | 1732 | 2003 | 1888 |

*a minimum estimate, as after 99999 minutes the counter used to determine time was reset, and the measurement was finished.

TABLE 4

Static shear of adhesive layer compositions at room temperature of 35° C. and relative humidity of 75%.

| Sample | Shear 1 (minutes) | Shear 2 (minutes) | Shear 3 (minutes) | Shear average (minutes) |
|---|---|---|---|---|
| S1 | 1210 | 1109 | 1529 | 1283 |
| C1 | 40 | 41 | 36 | 117 |
| C2 | 799 | 799 | 808 | 802 |
| C3 | 66 | 98 | 67 | 77 |
| C4 | 242 | 218 | 183 | 214 |
| C5 | 290 | 350 | 201 | 280 |

As can be seen from the results of tables 3 and 4, the static shear of a composition may depend of the temperature and relative humidity of the measurement. The adhesive layer composition S1 has a static shear which is equal or higher than 10000 minutes, when determined from a glass plate at a temperature of 25° C. according to FINAT test method no. 8 (9th edition, 2009). Further, the adhesive layer composition S1 also has a static shear which is equal or higher than 1000 minutes at a temperature of 35° C. and 75% relative humidity, when determined according to modified FINAT test method no. 8 (9th edition, 2009) from a glass plate.

Gel Content, Molecular Weight and Molecular Weight Distribution Analysis

Gel content, molecular weight and its distribution can be determined from a water based acrylate polymer composition by gravimetric analysis and gel permeation chromatography, also referred to as GPC, which is a variant of size exclusion chromatographic analysis. Gel content, in this context, refers to an insoluble mass fraction of the water based acrylate polymer composition, and may be determined by gravimetric means. Gel content therefore is a measure of the degree of cross-linking within the water based acrylate polymer composition. The molecular weight and distribution analysis may be determined from the soluble mass fraction with GPC.

A Soxhlet extractor may be used for gravimetric analysis of a compound which has a limited solubility in a solvent. The solvent may be a medium polarity eluents, such as tetrahydrofuran, toluene, methyl ethyl ketone or ethyl acetate. Alternatively, the solvent may be a more polar organic eluents, such as dimethylformamide, dimethylacetamide or hexafluoroisopropanol. Preferably, when determining a composition comprising water-dispersible acrylate polymer formed of relatively polar monomers by means of Soxhlet extraction, tetrahydrofuran, hereafter referred to as THF, is used as a solvent.

A Soxhlet extractor is well known in the art for the purpose of extraction, in particular for obtaining extractable components from a solid sample. When determining the gel content of a sample, the Soxhlet extractor is used to separate the insoluble (i.e. cross-linked) mass fraction of the sample. After the Soxhlet extraction, the insoluble mass fraction is determined by gravimetric analysis. The result of the gravimetric analysis is known as the gel content of the sample. The determination of molecular weight may be performed on the extractables of the sample, which in the case of water based acrylate polymer composition have been dissolved into THF. The molecular weight and molecular weight distribution of the extractables can be determined with a GPC/SEC instrument, which separates the components forming the extractables to different fractions based on molecular size. The smaller the molecular size of the components is, the longer it takes for them to pass a porous GPC/SEC column. The pore size and porosity of the GPC/SEC column is selected to separate the components forming the extractables based on their molecular weight. The retention time of a polymer having a smaller molecular weight is longer than the retention time of a polymer having a higher molecular weight, which enables to analyse both the molecular weight as well as the molecular weight distribution of the sample. In other words, a polymer having a larger molecular size will pass the column in less time than a polymer having a smaller molecular size. Therefore the polymer having a smaller molecular size stays in the column longer and has a different retention time than the polymer having a larger molecular size.

The Soxhlet extractor has four main sections: a percolator (boiler containing a reflux) which circulates a solvent from an extraction flask containing the solvent, a thimble (Whatman paper) which retains the sample of dried PSA layer composition to be extracted, a condenser which cools the solvent evaporated from the percolator and a siphon mechanism, which periodically empties the solvent containing extracted contents of the thimble into the extraction flask. The Soxhlet extractor thus operates by gravimetric means and circulates a solvent between the extraction flask and the thimble. Thereby, the soluble portion of the PSA composition may be extracted into the solvent, while the insoluble portion of the PSA composition remains on the thimble.

When determining a composition comprising water-dispersible acrylate polymer, the following Soxhlet extraction protocol may be used.

Equipment for Soxhlet extraction:
Soxhlet assembly, including Soxhlet extractor (BUCHIB-811)
Whatman single thickness extraction cellulose thimbles (grade 8-11 microns, 5*80 mm)

In the Soxhlet extraction, the amounts are weighed with an analytical grade balance having an accuracy of 0.1 mg. The measurements are performed in duplicates, wherein a weighed sample amount of 2 grams is used. In addition, a blank extraction is performed as a control, using only the THF solvent without a sample. The results are reported as average result calculated from the duplicate measurements.

Each sample of 2 grams is first dried on an aluminium plate, in a drying oven at 105° C. for 2 hours. The oven dried sample on the aluminium plate is then transferred into a fume hood at a room temperature of 25° C. for 4 hours. Thereafter, the sample is further dried in a vacuum oven set at a −0.1 Mpa overnight (12 hours). The dry sample is then placed on a cellulose thimble, dried and weighed. The sampled drying is used to provide an initial dry sample weight $W_0$. The cellulose thimble weight $W_T$ is excluded from the initial dry sample weight $W_0$.

Soxhlet extraction may be performed with the assembly according to manufacturer's instructions, with the following settings:
150 ml extraction flasks used (2 samples and a blank control)
0.30 g of dry sample weighed into the bottom of the thimbles,
120 ml of THF (BHT free) added into each extraction flask
cooling with a water-cooled circulating bath (3° C., with $N_2$ valve),
the Soxhlet assembly parameters selected as
model=SOXHLET WARM,
step 1=extract mode,
under heating power=9,
above heating power=4,
extraction period=16 hours,
step 2=soak mode,
heating power=9,
time=20 minutes,
step 3=concentration mode
heating power=9,
time=30 minutes.

Advantageously, the heating power is adjusted such that the drip rate of the THF from the condenser to the thimble is approximately three drops per second. During the extraction, some of the THF added into each extraction flask may be lost. Hence the amount THF in the extraction flasks needs to be monitored for the entire reflux period. If needed, more THF (BHT free) may be added to replace the lost amount.

At the end of the extraction period of 16 hours, the heating is turned off. When the refluxing has ceased, the Soxhlet apparatus is taken apart, such that the thimbles are separated from the percolators and the condensers. Any THF left in the condensers is poured into the extraction flasks. The Soxhlet extractor is then operated in a concentration mode to evaporate THF from the extraction flasks (step 3, above). The evaporation is continued for approximately 30 minutes but stopped prior to the THF completely evaporates from the extraction flasks.

The THF used as a solvent in the Soxhlet extraction contains the extractive, which is the THF soluble portion of the sample containing the PSA composition. The THF used as a solvent is transferred into a dry and weighed beaker (100 ml size), which has been cleaned three times with 30 ml of THF (BHT free). The beaker weight $W_{b1}$ is used to determine the weight of the extractive $W_{SOL}$. The beaker containing the THF is then put into a water bath having a temperature of 40° C. for the THF to evaporate. After the THF has completely evaporated, the beaker is purged with nitrogen gas to dry. The beaker is then removed from the water bath and heated on a plate at 40° C. temperature overnight (12 hours). The heating on a plate at 40° C. temperature may be continued further, if needed, until THF odor can no longer be detected. Then, the beaker is allowed to cool down to room temperature of 25° C. Then the cooled beaker is weighed to determine the weight of the beaker $W_{b2}$ containing the extractive.

GPC Analysis for Determination of Number Average Molecular Weight ($M_n$), Mass Average Molecular Weight ($M_w$) and Polydispersity ($M_w/M_n$):

Molecular weight properties of an acrylate polymer composition may be determined from tetrahydrofuran soluble mass fraction by means of gel permeation chromatography according to standard CEN/TS 14577 (2003). In the standard, the MW calibration is set to a 1000 Dalton cut-off point. However, when providing MW standards above the 1000 Dalton cut-off point, also compositions having higher molecular weight may be determined. Therefore, GPC according to the standard may be used for determination of polymer molecular weight of an adhesive layer composition comprising emulsion polymerized acrylate polymer.

Gel permeation chromatography, referred to as GPC, is a variant of high-pressure liquid chromatography. The determination of polymer molecular weight may be done from the extractive, which is the THF soluble portion of the sample. The THF used for determination of polymer molecular weight may be stabilized with BHT (250 ppm), the BHT referring to 2,6-di-tert-butyl-p-cresol. A method to determine polymer molecular weight from an extractive comprising water-dispersible acrylate polymer may comprise
- adding 20 ml THF (with 250 ppm BHT) into the cooled beaker,
- waiting for 2 hours to ensure that the extractive has dissolved, thereby forming an extractive solution,
- collecting extractive solution with a 0.45 µm syringe, thereby forming an amount of filtrated extractive solution, and
- ejecting the amount of filtrated extractive solution into a 2 ml sample bottle that is suitable for GPC analysis.

The GPC analysis may be performed with a GPC instrument. The equipment for GPC analysis may comprise, for example:
- GPC/SEC system with RI detector (PL-GPC50 plus, Agilent Technologies)
- GPC/SEC pre-column (PLgel, 5 µm Guard, 50*7.5 mm, Agilent Technologies)
- GPC/SEC mixed column (PLgel, 5 µm Guard, MIXED-C 300*7.5 mm (200-2000000), Agilent Technologies)

The GPC analysis may be performed according to manufacturer's instructions. with the following settings:
- mobile solvent=THF (with 250 ppm BHT),
- flow rate=1 ml/min,
- column temperature=35° C.,
- standard polymethyl methacrylate sample solutions (0.05% concentration)
  - std1=1050000, 211000, 17800, 2880
  - std2=1400000, 569000, 68800, 6850
- cold storage refrigeration less than 3 months Calculation of the Degree of Cross-Linking:
Referring to the description above,
1. $W_0$=initial dry sample weight (THF soluble part and THF insoluble part)
2. $W_{b2}$=weight of the beaker containing the extractive
3. $W_{b1}$=weight of the beaker (empty)
4. $W_T$=weight of the thimble
5. $W_{SOL}$=weight of the extractive (THF soluble part)
6. $W_{INSOL}$=sample weight on the thimble after Soxhlet extraction (THF insoluble part)

The weight of the extractive $W_{SOL}$, which represents the THF soluble portion of the sample, is calculated as the difference between the empty beaker weight $W_{b1}$ and weight of the beaker containing the extractive $W_{b2}$, after the THF has been evaporated completely:

$$W_{SOL} = W_{b2} - W_{b1}$$

The sample weight on the thimble after Soxhlet extraction, which represents the THF insoluble part of the sample, is calculated as the difference between the initial sample weight $W_0$ and the weight of the extractive $W_{SOL}$:

$$W_{INSOL} = W_0 - W_{SOL}$$

When calculating the initial dry sample weight $W_0$, which represents both the THF insoluble and soluble parts of the sample, the weight of the thimble $W_T$ is to be excluded. The insoluble portion may be expressed as weight percentages of the dry initial sample weight $W_0$. Therefore, a tetrahydrofuran insoluble mass fraction of an adhesive layer composition, which represents the degree of cross-linking, may be expressed as $$\text{THF insoluble mass fraction} = W_{INSOL} * 100\%$$

wherein the percentage refers to a percentage by weight (wt.-%).

The cross-linking of an acrylate polymer decreases the solubility of the cross-linked part of the polymer to solvents like tetrahydrofuran. By separation of the PSA composition to THF soluble and insoluble portions, the characteristics of the PSA composition may be determined. The THF insoluble portion may be used to determine the degree of cross-linking of the adhesive layer composition, also referred to as the gel content. The THF soluble portion may be used to determine the number average molecular weight $M_n$, mass average molecular weight $M_w$ and polydispersity PD ($=M_w/M_n$) of the adhesive layer composition, wherein the analysis is based on peak comparison between sample and calibration curves. These properties may be used to define the adhesive layer composition. Such properties, when determined from an adhesive layer composition, may be used to predict the resistance of the adhesive layer composition to fragmentation in paper recycling process conditions.

In a comparative experimental test, the molecular weight and the degree of cross-linking of the adhesive layer composition S1 were determined by gravimetric means and GPC, respectively, and compared to results of a conventional adhesive layer composition C1. Table 5 (below) presents the results of the experimental test. Two separate measurements (1.test and 2.test) were performed for each composition, of which the average value was calculated, which represents the determined weight percentage (GEL %), number average molecular weight ($M_n$), mass average molecular weight ($M_w$) and polydispersity (PD=$M_w$/Me) of the composition.

TABLE 5

Gravimetric analysis and gel permeation chromatography results of adhesive layer compositions S1 and C1. The columns refer to THF insoluble fraction in weight percentage (GEL %) representing the gel content of the sample obtained by gravimetric analysis, and the number average molecular weight ($M_n$), mass average molecular weight ($M_w$) and polydispersity (PD = $M_w/M_n$) of the sample obtained by GPC analysis.

|  |  | GEL % | $M_n$ | $M_w$ | PD |
|---|---|---|---|---|---|
| S1 | 1. test | 69.15 | 40101 | 151486 | 3.78 |
|  | 2. test | 69.08 | 39174 | 147241 | 3.76 |
|  | Average | 69.12 | 39638 | 149364 | 3.77 |

TABLE 5-continued

Gravimetric analysis and gel permeation chromatography results of adhesive layer compositions S1 and C1. The columns refer to THF insoluble fraction in weight percentage (GEL %) representing the gel content of the sample obtained by gravimetric analysis, and the number average molecular weight ($M_n$), mass average molecular weight ($M_w$) and polydispersity (PD = $M_w/M_n$) of the sample obtained by GPC analysis.

|  |  | GEL % | $M_n$ | $M_w$ | PD |
|---|---|---|---|---|---|
| C1 | 1. test | 29.44 | 57956 | 324385 | 5.60 |
|  | 2. test | 29.13 | 58069 | 304383 | 5.24 |
|  | Average | 29.29 | 58013 | 314384 | 5.42 |

From the experimental test results it can be observed, that the sample S1 displays a considerably higher level of tetrahydrofuran insoluble mass fraction than in the comparative sample C1. The tetrahydrofuran insoluble mass fraction of sample S1 is equal to or higher than 65 wt.-%, when determined by gravimetric means using a Soxhlet extractor, as disclosed above. The tetrahydrofuran insoluble mass fraction of the composition S1 comprising water-dispersible acrylate polymer correlates with the resistance to fragmentation in paper recycling process conditions, as can be perceived when comparing the results of this experimental test to the results with respect to recycling compatibility of a label comprising the same PSA layer composition S1.

From the experimental test results it can be further observed, that the composition S1 has a number average molecular weight $M_n$ and a mass average molecular weight $M_w$ that are lower than those of the comparative sample C1. Further still, the polydispersity PD, which is the ratio of the mass average molecular weight $M_w$ to the number average molecular weight $M_n$, is much more narrow in the composition S1 than in the comparative sample C1.

Thus, an adhesive layer having a composition selected to comprise emulsion polymerized, water-dispersible acrylate polymer, and non-ionic copolymer based on polyethylene glycol and polypropylene glycol, may have a tetrahydrofuran insoluble mass fraction, which is to is equal to or higher than 65%, preferably equal to or higher than 67 wt.-%, most preferably equal to or higher than 69 wt.-%, such as in the range of 65 to 75 wt.-%, preferably in the range of 67 to 74 wt.-%, most preferably in the range of 69 to 72 wt.-%, when determined by gravimetric means using a Soxhlet extractor.

Further, an adhesive layer having a composition selected to comprise emulsion polymerized, water-dispersible acrylate polymer, and non-ionic copolymer based on polyethylene glycol and polypropylene glycol, may have
  a number average molecular weight ($M_n$) that is equal to or less than 45000 g/mol, preferably in the range of 35000-45000 g/mol, and/or
  a mass average molecular weight ($M_w$) that is equal to or less than 175000 g/mol, preferably in the range of 145000-175000 g/mol, and/or
  a polydispersity ($M_w/M_n$) that is between 2 and 4 preferably between 3 and 4,
when determined by means of gel permeation chromatography according to standard CEN/TS 14577 (2003).

Viscoelastic Properties (DMA)

The design of a composition which is suitable for use as a PSA involves awareness of the rheological characteristics required from the composition, when used as an adhesive layer of a label. An important aspect of a PSA is that the composition gains strength via dissipation. In other words, when a sufficient pulling force is applied, the adhesive composition begins to fail cohesively, such that energy that would otherwise pull the composition apart at the interface is absorbed by the composition. The rheological properties of the composition may further be described by the dynamic storage modulus and dynamic loss modulus. Dynamic storage modulus, denoted as G', measures the stored energy within the composition. Dynamic storage modulus thus represents the elastic portion. Dynamic loss modulus, denoted as G", measures the energy dissipated as heat. Dynamic loss modulus represents the viscous portion. In a situation above the glass transition temperature, where G' is larger than G", the composition has capacity to store energy and may return to its initial configuration, when a mechanical force is applied on the material. The composition thus has elastic behaviour. In a situation where G" is larger than G', a mechanical force applied on the composition causes the internal structure of the composition to collapse, such that the composition flows. The viscoelastic properties of a PSA composition may be determined by dynamic mechanical analysis, referred to as DMA.

The 'Chang window' (Chang, E. P. "Viscoelastic Properties of Pressure Sensitive Adhesives", The Journal of Adhesion, 1997, Vol. 60, pp. 233-248 and Chang, E. P., The Journal of Adhesion, Vol. 34, 1991, issue 1-4, pages 189-200) is a quadrant-based viscoelastic window, which may be used for evaluating the properties of a PSA composition. The Chang window enables a construction of a cross-plot from the values of dynamic storage modulus G' and dynamic loss modulus G" on logarithmic scales at frequencies in the range of 0.01 to 100 radians per second (rad/sec), which correspond and cover typical time scales used for testing PSA performance.

The location of the formed cross-plot at the Chang window may be used to evaluate the characteristics of the tested adhesive composition. The lower the height of the sample in the Chang window is, the higher is the shear resistance. Location of the Chang window therefore indicates what type of adhesive properties the composition possesses.

Figure 3:
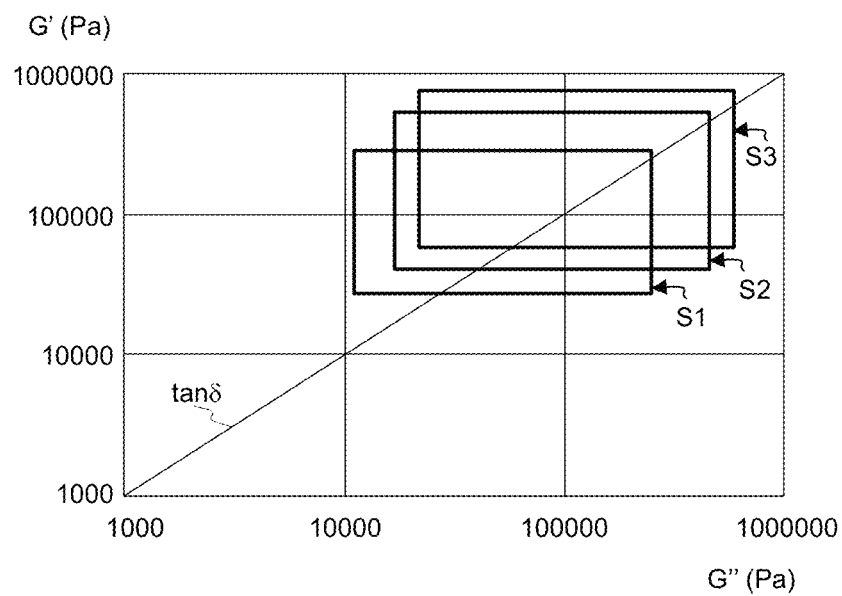
FIG. 3 illustrates by means of a Chang window the high shear of pressure sensitive adhesive layer compositions comprising emulsion polymerized, water-dispersible acrylate polymer and non-ionic copolymer based on polyethylene glycol and polypropylene glycol.

Reference is made to FIG. 3, which illustrates by way of a Chang window the viscoelastic properties of adhesive layer compositions S1, S2 and S3. The horizontal axis represents the dynamic loss modulus G" in units of Pascal. The vertical axis represents the dynamic storage modulus G' in units of Pascal. Both the axes have been drawn in logarithmic scale. The diagonal line represents the loss factor tan δ, which refers to the ratio of the loss modulus G" to the storage modulus G'. As can be observed from FIG. 3, the adhesive layer compositions S1, S2 and S3 have high dynamic storage modulus G' and high dynamic loss modulus G" values. The adhesive layer compositions S1, S2 and S3 demonstrate unusually high shear for compositions which are to be used as pressure sensitive adhesives, which is evident due to the location of the formed cross-plots located in the upper right corner of the Chang Window.

The viscoelastic properties of the adhesive layer composition S1 may be further characterized with oscillation frequency sweep and temperature sweep. A temperature sweep may be used to determine a number of characteristics of a PSA composition, such as glass transition temperature $T_g$, wet ability, adhesion potential, elasticity or cohesion. A frequency sweep may be used to determine the response of a composition to timescale dependent behavior. In an oscillation temperature sweep, the deformation amplitude and the frequency are kept constant. In an oscillation frequency sweep, the deformation amplitude and temperature are kept constant. In both oscillation frequency and temperature sweeps, the dynamic loss modulus G" and the dynamic storage modulus G', in units of Pascal (Pa), are plotted against the varied parameter. In oscillation frequency sweep, the varied parameter is angular frequency co, in units of radians per second (rad/s). In oscillation temperature sweep, the varied parameter is temperature, in units of Celsius grade (° C.). The loss factor tan δ is the ratio of the dynamic loss modulus G" to the dynamic storage modulus G', in other words, tan δ=G"/G'

In an experimental test, the viscoelastic properties of the adhesive layer compositions S1 and S2 as well as the viscoelastic properties of a comparative composition C1 were determined with DMA by means of a temperature sweep and a frequency sweep. The equipment used in the measurements was Anton Paar MCR 302 rheometer with liquid $N_2$ cooling, 8 mm parallel plate measurement geometry and 1 mm sample thickness. In the temperature sweep the following parameters were selected:

Constant frequency of 1 Hz and amplitude of 0.1%
Temperature ramp 2° C./min from −45 to +100° C.

In the frequency sweep, the following parameters were selected:

Constant amplitude 0.5%
Angular frequency 1 to 50 rad/s at temperatures −5, +5, +15, +25, +45, +75 and +100° C.

The measurements involving a temperature change were set to run at a linear rate of 2° C./min. The temperature range was from −45° C. to 100° C. The measurements were performed in accordance with ISO standard 6721-10 (version 2015). The DMA measurement geometry details thus were parallel plate PP08, with 1 mm gap and 8 mm diameter (measurement head serial #32863).

Figure 4:
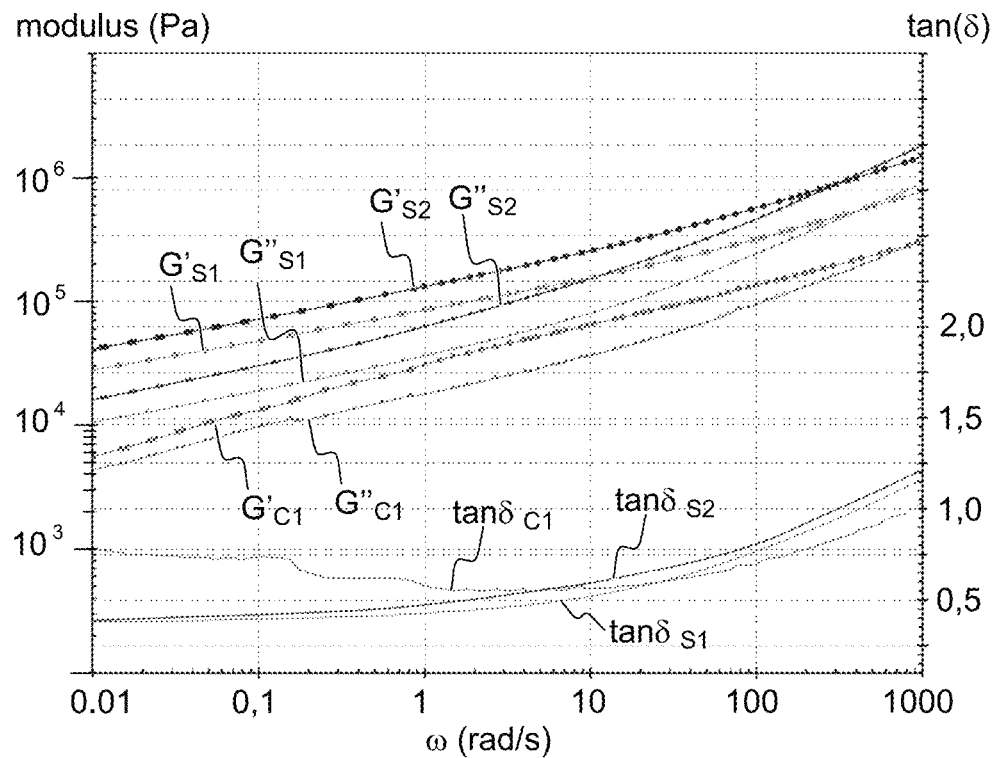
FIG. 4 is a frequency sweep result of an experimental test characterizing the viscoelastic properties of adhesive layer compositions.
Figure 5:
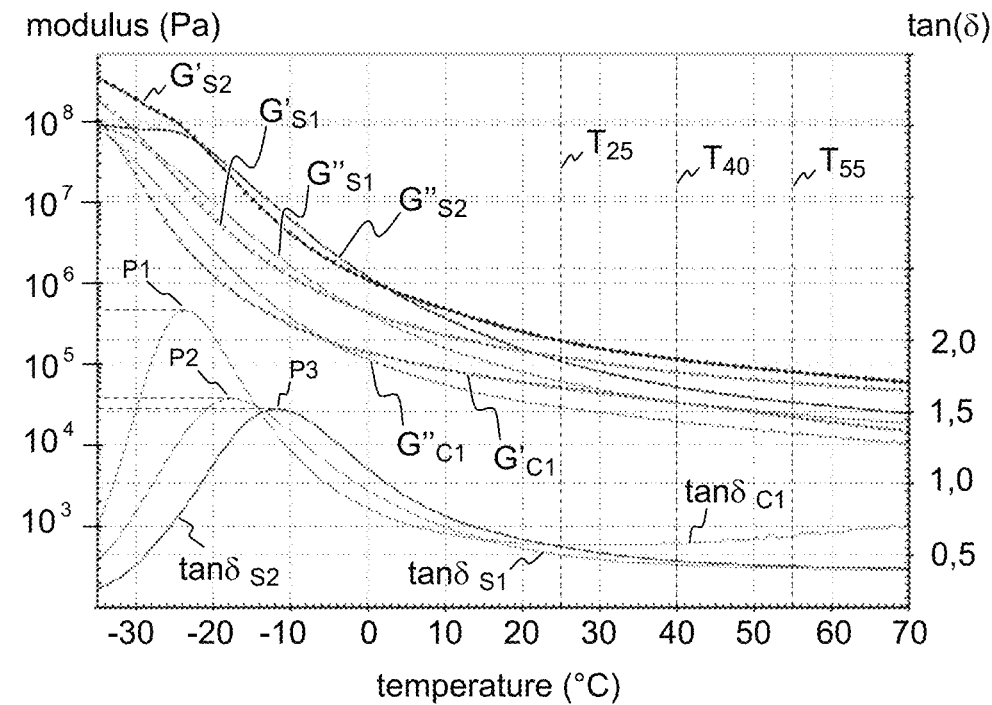
FIG. 5 is a temperature sweep result of an experimental test characterizing the viscoelastic properties of adhesive layer compositions.

Reference is made to FIG. 4, which indicates the results of a frequency sweep experiment performed on adhesive layer compositions S1, S2 and C1 and to FIG. 5, which indicates the results of a temperature sweep experiment performed on adhesive layer compositions S1, S2 and C1. The curves $G'_{S1}$, $G"_{S1}$ and tan $δ_{S1}$ represent the behavior of adhesive layer composition S1 dynamic storage and loss moduli as a function of angular frequency (in FIG. 4) and temperature (in FIG. 5). Respectively, the curves $G'_{S2}$, $G"_{S2}$ and tan $δ_{S2}$ represent the behavior of adhesive layer composition S2 and the curves $G'_{C1}$, $G"_{C1}$ and tan $δ_{C1}$ represent the behavior of adhesive layer composition C1. The horizontal axis in FIG. 4 indicates the angular frequency ω, in units of radians per second (rad/s). The horizontal axis in FIG. 5 indicates the temperature, in units of Celsius (° C.). The vertical axis on the left side indicates the value of dynamic loss modulus G" and dynamic storage modulus a, in units of Pascal. The vertical axis on the right side indicates the determined value of the loss factor tan δ.

Both the frequency and the temperature sweeps demonstrated that the adhesive layer composition S1 had the highest dynamic storage modulus $G'_{S2}$ value throughout the range used in the frequency and the temperature sweeps. Further, the adhesive layer compositions S1 and S2 had a higher dynamic storage modulus $G'_{S2}$, $G'_{S1}$ than the comparative adhesive layer composition C1, throughout the frequency and temperature ranges. The comparative adhesive layer composition C1 demonstrated the lowest dynamic storage modulus $G'_{C1}$.

The maximum value of the loss factor tan δ, denoted at points P1, P2 and P3 in the FIG. 5, indicates the adhesion potential of each adhesive layer composition. It can be observed, that the comparative adhesive layer composition C1 reached the maximum value of the loss factor tan δ at a much lower temperature than the adhesive layer compositions S1 and S2. The maximum value of the loss factor tan δ of the composition C1 was at −25° C., whereas the maximum values of the loss factor tan δ of the compositions S1 and S2 were at temperatures of −17.7° C. and −12.0° C., respectively. A low tan δ value of the adhesive layer compositions S1 and S2 correlates with self-adhesive capability. The occurrence of the peak maxima of the loss factor tan δ at a higher temperature further indicates a capability of the compositions S1 and/or S2 to resist fragmentation in a paper recycling process. An adhesive layer composition with a low tan δ value (i.e low peak height) and high dynamic loss modulus G" level at a rubber plateu may further predict agglomeration tendency of the composition in a paper recycling process, which may help to reduce problems caused by 'sticky' particles. Table 6 (below) presents the dynamic loss modulus G" value, dynamic storage modulus G' value, the maximum value of the loss factor tan δ and the temperature at points P1, P2 and P3, in the compositions S1, S2 and C1.

TABLE 6

The dynamic loss modulus G" value in units of megaPascals (MPa), dynamic storage modulus G' value in units of megaPascals (MPa), the maximum value of the loss factor tanδ and the temperature at points P1, P2 and P3, in the compositions S1, S2 and C1.

| Composition | Point (FIG. 5) | Temp. (° C.) | G' (MPa) | G" (MPa) | tanδ |
|---|---|---|---|---|---|
| C1 | P1 | −25.3 | 4.42 | 9.53 | 2.15 |
| S2 | P3 | −17.7 | 3.98 | 6.34 | 1.59 |
| S1 | P2 | −12.0 | 5.83 | 8.85 | 1.52 |

The temperature sweep further demonstrated that the adhesive layer composition S1 had the highest dynamic storage modulus $G'_{S2}$ value at room temperature $T_{25}$, as can be observed from FIG. 5. Table 7 (below) presents the dynamic loss modulus G" value, dynamic storage modulus G' value and the loss factor tan δ for the compositions S1, S2 and C1 at a room temperature of 25° C.

TABLE 7

The dynamic loss modulus G" value, dynamic storage modulus G' value and the loss factor tanδ for the compositions S1, S2 and C1 at a room temperature of 25° C.

| Sample | Point (FIG. 5) | Temp. (° C.) | G' (MPa) | G"(MPa) | tanδ |
|---|---|---|---|---|---|
| C1 | $T_{25}$ | 25 | 0.05 | 0.03 | 0.57 |
| S2 | $T_{25}$ | 25 | 0.19 | 0.11 | 0.56 |
| S1 | $T_{25}$ | 25 | 0.12 | 0.06 | 0.50 |

As may be observed from the Table 7 (above), at a room temperature $T_{25}$ the compositions S1 and S2 presented high loss modulus G" and high storage modulus (G'). The loss modulus G" of the composition S2 was around 60000 Pascal and the loss modulus G" of the composition S1 was around 110000 Pascal, when determined at a temperature of 25° C. The storage modulus G' of the composition S2 was around 190000 Pascal and the storage modulus G' of the composition S1 was around 120000 Pascal, when determined at a temperature of 25° C. All the modulus values of the compositions S2 and S1 were thus higher than the storage modulus G' of the composition S2, which was around 50000

Pascal and the storage modulus G' of the composition S2, which was around 30000 Pascal, when determined at a temperature of 25° C.

The temperature sweep also demonstrates the behavior of the compositions S1 and S2 in a temperature in the range of 40 to 55° C., which differs from the behavior of the comparative composition C1. This temperature range is a conventional range for a paper recycling process, in particular to one comprising a flotation treatment in an alkaline environment. As can be seen from Table 8 (below), the loss factor tan δ in the comparative composition C1 in a temperature in the range of 40 to 55° C. is between 0.59 and 0.63. In contrast, the loss factor tan δ in the compositions S1 and S2 is less than 0.5. The loss factor tan δ in the range of 40 to 55° C. has been marked in FIG. 5 as the section between the temperatures $T_{40}$ and $T_{55}$.

TABLE 8

The dynamic loss modulus G" value, dynamic storage modulus G' value and the loss factor tanδ for the compositions S1, S2 and C1 in temperatures of 40, 45, 50 and 55° C.

| Temp. (° C.) | Composition C1 | | | Composition S2 | | | Composition S1 | | |
|---|---|---|---|---|---|---|---|---|---|
| | G' (MPa) | G" (MPa) | tanδ | G' (MPa) | G" (MPa) | tanδ | G' (MPa) | G" (MPa) | tanδ |
| 40 | 0.034 | 0.020 | 0.59 | 0.114 | 0.052 | 0.46 | 0.079 | 0.034 | 0.43 |
| 45 | 0.029 | 0.018 | 0.60 | 0.101 | 0.045 | 0.44 | 0.071 | 0.030 | 0.43 |
| 50 | 0.025 | 0.016 | 0.63 | 0.088 | 0.038 | 0.43 | 0.064 | 0.026 | 0.42 |
| 55 | 0.022 | 0.014 | 0.63 | 0.080 | 0.034 | 0.43 | 0.058 | 0.024 | 0.41 |

Based on the experimental test results, the adhesive layer composition may be selected to comprise emulsion polymerized, water-dispersible acrylate polymer, and non-ionic copolymer based on polyethylene glycol and polypropylene glycol, such that the composition has
 a loss modulus G" and a storage modulus G' which are higher than 50000 Pascal, when determined at a temperature of 25° C., and wherein
 the ratio tan δ of the loss modulus G" to the storage modulus G' is less than 0.56,
when determined with parallel plates geometry of 8 mm diameter and a gap of 1 mm, at 0.5% strain, at 1 Hz frequency, under temperature ramp having a linear rate of 2° C./min in a temperature range of −45° C. to 100° C., in accordance with ISO standard 6721-10 (version 2015).

Further, at a temperature in the range of 40 to 55° C., the composition advantageously has a ratio tan δ of the loss modulus G" to the storage modulus G' equal to or less than 0.5, preferably equal to or less than 0.46, most preferably equal to or less than 0.43, such as in the range of 0.41 to 0.49, preferably in the range of 0.41 to 0.46, most preferably in the range of 0.41 to 0.43.

Recyclability

Assessment of the Adhesive Layer with Removal Score

Figure 6:
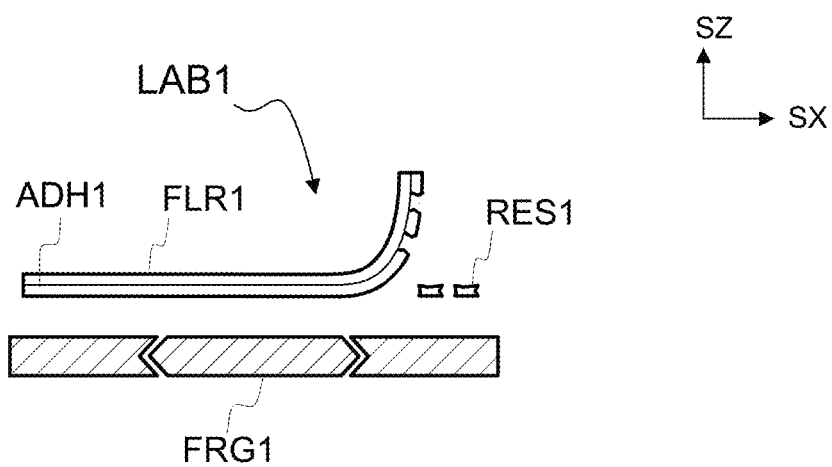
FIG. 6 illustrates, by way on an example, the disintegration, of a pressure sensitive adhesive layer into fragments which may be screened out of a pulp slurry that contains cellulose fibres.
Figure 7:
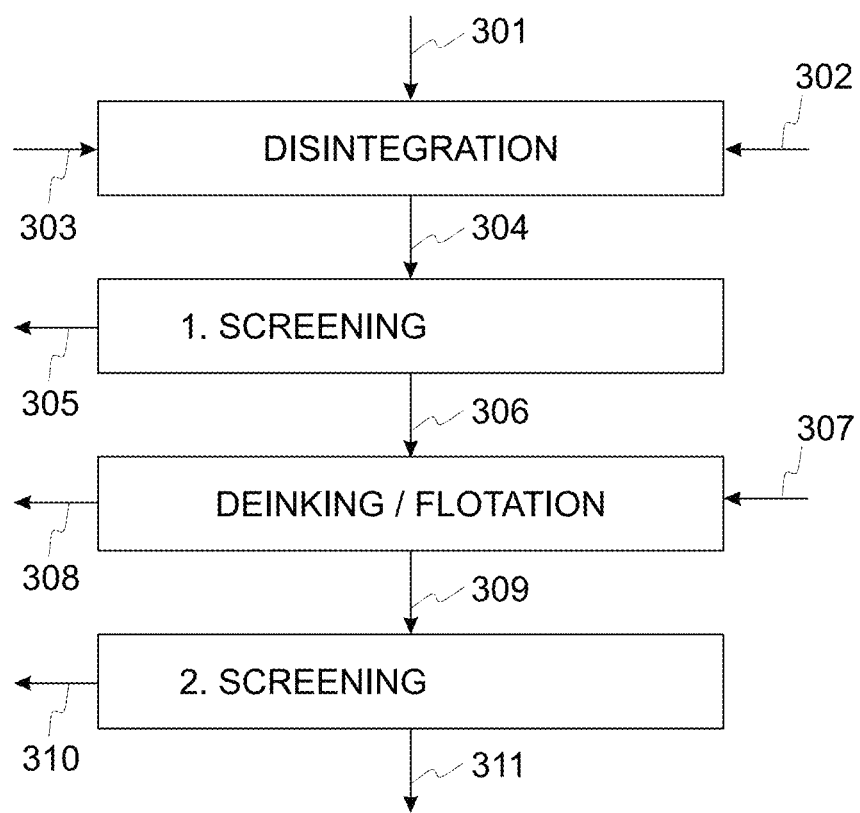
FIG. 7 illustrates, by way on an example, a paper recycling process for removing adhesive layer fragments from a pulp slurry to obtain recovered pulp.

Reference is made to FIGS. 6 and 7. The label LAB1 comprising the adhesive layer ADH1 and the face layer FLR1 may be recycled. A paper recycling process involves a mechanical disintegration step of the material 301 containing cellulose fibres into smaller fragments FRG1, wherein the disintegration is aided with water 302. When the face layer FLR1 is a paper face layer, the face layer FLR1 may also disintegrate into smaller fragments FRG1. Typically, the water is heated to a temperature in the range of 40 to 50° C. To aid the disintegration, chemicals 303 may be added into the process. In these conditions, the adhesive layer ADH1 also breaks down into smaller fragments RES1. Thereby, a pulp slurry 304 may be formed. The pulp slurry 304 may then be subjected to a first screening step, wherein solid contaminants 305 having a large diameter, such as metal and plastic objects, may be separated from the pulp slurry 304. The screened pulp slurry 306 may then be subjected to a deinking and/or flotation treatment. The deinking and/or flotation treatment aims to remove fine particulate contaminants 308, such as ink particles, which are typically present in printed paper products. To aid the deinking and/or flotation treatment, chemicals 307, such as surfactants, may be added into the deinking and/or flotation treatment. The treated pulp slurry 309 may be subjected to a second screening step. The treated pulp slurry 309 may thus be screened mechanically, for example with slotted sieves, to remove adhesive layer fragments 310 from the treated pulp slurry 309. Thus, recovered pulp 311 may be obtained, which is sufficiently free of solid contaminants 305, fine particulate contaminants 308 and adhesive layer fragments 310, such that the recovered pulp 311 is suitable for use in a paper manufacturing process. Variations of the paper recycling process exist. For example, the screening and the deinking and/or flotation treatment may be combined. Advantageously, the treated pulp slurry 309 may be screened mechanically, for example with the aid of flotation treatment effluents, such as with the aid of first loop clear filtrate of a deinked pulp (DIP) line.

The recyclability assessment of the adhesive layer may be simulated. The INGEDE Methods (2013) simulate unit operations of a deinking plant meant to produce recycled pulp. INGEDE Method 12 (2013) may be used to test the adhesive layer fragmentation behaviour and recycling compatibility of a label comprising a paper face layer and a pressure sensitive adhesive layer. Advantageously, the selected combination of PSA layer composition and coat weight has a capability to resist disintegration in aqueous conditions at a temperature in the range of 40 to 55° C. present in a paper recycling process. Thus after the disintegration, the pressure sensitive adhesive layer may to a high extent remain in fragments which are easier to screen out of the pulp slurry that contains cellulose fibres from the paper face layer. In particular, the label comprising the paper face layer and the PSA layer is compatible with a paper recycling process that has been configured to use filtrate, such as paper mill first loop clear filtrate of a deinked pulp (DIP) line. Therefore, the adhesive layer is suitable for mechanical separation from a pulp slurry in an industrial scale, at least to an extent that residues which possibly remain in the pulp slurry no longer cause problems in the paper recycling process or later at a paper mill.

In an experimental test, the fragmentation behavior of the adhesive layer composition S1 was compared to conventional adhesive layer compositions C1-C5. In the test, six different types of labels were prepared on an industrial scale label line comprising a gravure coating unit. A larger label line with an industrial scale coating unit was selected to produce a sufficient amount of representative labels of each type, wherein the variation between individual labels was minimized. The label types were all prepared in the same manner, to further ensure comparability between the label types. Each label type contained the same paper face layer material containing cellulose fibers and having a substance of 80 g/m². The first label type was coated with an adhesive layer composition S1 such that the adhesive layer coat weight was 17 g/m². Since the first label type was coated with an adhesive layer composition S1 such that the adhesive layer coat weight was higher than 10 g/m², each of the other label types coated with an adhesive layer composition C1, C2, C3, C4 or C5 were also coated such that the adhesive layer coat weight was higher than 10 g/m² and in the range of 10 to 20 g/m². Each adhesive layer composition C1, C2, C3, C4 and C5 comprises a target coat weight, which was followed as closely as possible to maximize the comparability of the samples in the experiment. The other label types were coated with adhesive layer coat weights as follows: C1—17 g/m², C2—18 g/m², C3—13 g/m², C4—17 g/m², C5—20 g/m². The adhesive layer coat weight was determined as dry adhesive from the labels according to FINAT test method no. 12 (9th edition, 2009). Thus, the variable to be tested was the fragmentation behavior of the labels comprising a paper face layer and an adhesive layer. The labels were tested by first disintegrating each of the label types separately according to INGEDE Method 12 (2013) for PSA applications. Then, each of the label types was determined a Removal Score according to the European Paper Recycling Council Assessment of Printed Product Recyclability (15 Mar. 2018). The results of the experimental test are presented in Table 9 (below).

ing adhesive layer compositions C1-C5, when comparing the Removal Scores obtained by the layers. The Removal Score is based on particle size class distribution of an adhesive layer after disintegration, and illustrates the screenability of the tested adhesive layer at a deinking plant. The label comprising adhesive layer composition S1 was determined to have a Removal Score of 70 points, and thus was given a grade "Fair". This was only one point short of a grade "Good".

As can also be evidenced based on the results of the experiment, the label comprising adhesive layer composition S1 was far superior to the other labels comprising adhesive layer compositions C1-C5, when comparing the $S_{2000}$ value of the INGEDE Method 12 (2013). The $S_{2000}$ value represents the share of disintegrated adhesive layer area of fragments having a particle size less than 2000 µm identical equivalent circle diameter. Thus, a small $S_{2000}$ value indicates a low total area of particles having less than 2000 µm equivalent circle diameter, which particles originate from the adhesive layer. The $S_{2000}$ parameter therefore is a measure of the screening ability limit of the PSA label, with respect to adhesive particles having less than 2000 µm equivalent circle diameter produced during disintegration of the label in conditions used in a paper recycling process. In the labels comprising adhesive layer compositions C1-C5, the $S_{2000}$ value was in the range of 36 to 88%. In other words, more than one third of the adhesive layer fragments in the labels comprising adhesive layer compositions C1-C5 were particles having less than 2000 µm equivalent circle diameter. In comparison, only 12% of the adhesive layer fragments in the labels comprising adhesive layer composition S1 were particles having less than 2000 µm equivalent circle diameter.

Assessment of the Adhesive Layer Coat Weight

The effect of the adhesive layer coat weight was further tested in another experimental test, wherein the coat weight

TABLE 9

Size class distribution and EPRC ScoreCard results of labels comprising either an adhesive layer composition S1 or a comparative adhesive layer composition, denoted as C1-C5, after disintegration of the labels according to INGEDE Method 12 (2013).

| Size class [µm] | S1 | C1 | C2 | C3 | C4 | C5 | unit |
|---|---|---|---|---|---|---|---|
| 100-200 µm | 29 | 234 | 53 | 40 | 81 | 15 | mm²/kg |
| 200-400 µm | 80 | 1614 | 438 | 117 | 436 | 48 | mm²/kg |
| 400-600 µm | 104 | 8603 | 3901 | 1011 | 3273 | 58 | mm²/kg |
| 600-1000 µm | 757 | 38573 | 26738 | 9728 | 28197 | 3609 | mm²/kg |
| 1000-2000 µm | 6534 | 90274 | 100384 | 41384 | 120785 | 32718 | mm²/kg |
| 2000-3000 µm | 13502 | 17868 | 76106 | 37069 | 58155 | 34436 | mm²/kg |
| 3000-5000 µm | 44120 | 875 | 35370 | 22146 | 11526 | 28994 | mm²/kg |
| 5000-10000 µm | 0 | 0 | 1027 | 0 | 0 | 0 | mm²/kg |
| 10000-50000 µm | 0 | 0 | 0 | 0 | 0 | 0 | mm²/kg |
| 100-600 µm | 214 | 10451 | 4392 | 1169 | 3790 | 121 | mm²/kg |
| 600-1000 µm | 757 | 38573 | 26738 | 9728 | 28197 | 3609 | mm²/kg |
| 1000-2000 µm | 6534 | 90274 | 100384 | 41384 | 120785 | 32718 | mm²/kg |
| 100-2000 µm | 7504 | 139298 | 131514 | 52282 | 152772 | 36448 | mm²/kg |
| 100-200000 µm | 65126 | 158041 | 244016 | 111496 | 222453 | 99878 | mm²/kg |
| $S_{2000}$% | 12 | 88 | 54 | 47 | 69 | 36 | % |
| Removal Score | 70 | −19 | −2 | 2 | −9 | 7 | |

As can be evidenced based on the results of the experiment, the label comprising adhesive layer composition S1, which is the pressure sensitive adhesive layer, wherein the adhesive layer has a composition which is free of alkylphenol ethoxylate and has been selected to comprise emulsion polymerized, water-dispersible acrylate polymer, and non-ionic copolymer based on polyethylene glycol and polypropylene glycol, was far superior to the other labels comprisof the label comprising an adhesive layer composition S1 was reduced. All other variables were kept the same as in the experimental test, wherein the fragmentation behavior of the adhesive layer composition S1 was compared to conventional adhesive layer compositions C1-C5. The test thus compared a label comprising an adhesive layer composition S1 in two situations, wherein:

a) the coat weight is 17 g/m², which is higher than 10 g/m² and b) the coat weight is equal to 10 g/m².

The results of the test are presented in Table 10 below.

TABLE 10

Comparison of the effect of the adhesive layer coat weight to the recycling compatibility of a label comprising an adhesive layer composition S1 in situations (a) wherein the coat weight is 17 g/m², i.e. higher than 10 g/m² and (b) wherein the coat weight is equal to 10 g/m². The size class distribution and EPRC ScoreCard results have been determined after disintegration of the labels according to INGEDE Method 12 (2013).

|  | S1 (a) | S1 (b) | unit |
|---|---|---|---|
| size class 100-200 μm | 29 | 203 | mm²/kg |
| size class 200-400 μm | 80 | 524 | mm²/kg |
| size class 400-600 μm | 104 | 751 | mm²/kg |
| size class 600-1000 μm | 757 | 3788 | mm²/kg |
| size class 1000-2000 μm | 6534 | 18275 | mm²/kg |
| size class 2000-3000 μm | 13502 | 25752 | mm²/kg |
| size class 3000-5000 μm | 44120 | 53223 | mm²/kg |
| size class 5000-10000 μm | 0 | 0 | mm²/kg |
| size class 10000-50000 μm | 0 | 0 | mm²/kg |
| size class 100-600 μm | 214 | 1477 | mm²/kg |
| size class 600-1000 μm | 757 | 3788 | mm²/kg |
| size class 1000-2000 μm | 6534 | 18275 | mm²/kg |
| size class 100-2000 μm | 7504 | 23540 | mm²/kg |
| size class 100-200000 μm | 65126 | 102515 | mm²/kg |
| $S_{2000}$ | 12 | 23 | % |
| Removal Score | 70 | 14 | |

As can be observed from the Table 10 above, the recycling compatibility of the adhesive layer composition S1 is dependent of the coat weight of the adhesive layer. The adhesive coat weight correlates with the thickness of the adhesive layer. In practise, in view of performance at the coating unit, the coat weight of the adhesive layer composition S1 may be 23 g/m² or less, preferably 22 g/m² or less. In other words, a recycling compatible label, the label comprising a paper face layer and a pressure sensitive adhesive layer attachable to an object surface, may have an adhesive layer coat weight equal to or higher than 10 g/m², preferably equal to or higher than 13 g/m², most preferably equal to or higher than 17 g/m², such as in the range of 10 to 23 g/m² or 13 to 22 g/m², most preferably in the range of 17 to 21 g/m², when determined as dry adhesive from the label (LAB1) according to FINAT test method no. 12 (9th edition, 2009).

As can also be evidenced based on the results of the experiment, the particle size distribution of the adhesive layer composition S1 is dependent of the coat weight of the adhesive layer. When the coat weight of the adhesive layer composition S1 is reduced such that the coat weight is 10 g/m², a higher proportion of the adhesive layer fragments in the labels comprising adhesive layer composition S1 were particles having less than 2000 μm equivalent circle diameter. In the labels comprising adhesive layer composition S1 in an amount of 10 g/m², the $S_{2000}$ value was 23%, which was almost two times higher than the $S_{2000}$ value of the labels comprising adhesive layer composition S1 in an amount higher than 10 g/m². Thus, the PSA layer composition S1 may be configured to disintegrate into large fragments under aqueous conditions which simulate unit operations of a deinking plant, by increasing the coat weight of the adhesive layer. Therefore, a label comprising a PSA layer composition S1 may have a $S_{2000}$ value equal to or less than 23 mm²/kg, preferably equal to or less than 15 mm²/kg, most preferably equal to or less than 12 mm²/kg.

Effect of Screening and Flotation Treatments to Removal Efficiency

Deinking plants produce pulp for various paper applications and use predominantly paper for recycling as raw material. Flotation treatment is one of the most common deinking process operations used to recover recycled paper. The flotation treatment conventionally takes place in a temperature in the range of 40 to 55° C. and in an alkaline environment. The treatment is based on aeration of the pulp slurry whereby the ink particles may be arranged to attach into air bubbles, for example with the aid of surfactants. The air bubbles lift the ink to the surface such that the ink may be removed. The flotation treatment may contain multiple stags with flotation cells arranged in series. INGEDE Method 11 (2012) is a deinkability test, which has been developed to simulate the common operating conditions of relevant process steps in an industrial deinking plant under standard conditions in a laboratory scale.

To assess the effect of flotation treatment to the removal efficiency of a label comprising an adhesive layer composition S1, the INGEDE Method 12 was modified to simulate two separate situations, wherein
 a) the disintegration of the labels was complemented with a flotation treatment, using tap water throughout the procedure and
 b) the disintegration of the labels was complemented with a flotation treatment, using pulp/paper mill filtrate from throughout the procedure.

Thus, an experimental test was performed, wherein the fragmentation behavior of labels comprising the adhesive layer composition S1 was studied by performing three different disintegration. The first disintegration was performed on the labels as disclosed in the INGEDE Method 12 procedure (2013). All other variables were kept the same as in the experimental test, wherein the fragmentation behavior of the adhesive layer composition S1 was compared to conventional adhesive layer compositions C1-C5.

The second and third disintegration methods differed from the first disintegration method in that
 sample preparation was done as disclosed in the INGEDE METHOD 11 procedure for standard deinking recipe (Table 1), wherein, due to pH requirements of INGEDE METHOD 11 procedure, the chemical dosages related to oven-dry paper were adapted as follows
  a. 0.25% NaOH,
  b. 0.35% Oleic Acid,
  c. 1.1% Sodium silicate, and
  d. 1.4% Hydrogen peroxide.
Further modifications included
 use of a Hobert pulper filled with water or filtrate from pulp/paper mill or tap water having temperature of 50° C., and
 a laboratory flotation cell treatment of 8 minutes at 45° C. (Voith Delta 25™), as disclosed in INGEDE METHOD 11.

The difference between the second and the third disintegration methods was, that in the second disintegration method, tap water was used throughout the disintegration procedure, whereas in the third disintegration method, all dilutions in the procedure were done using filtrate from pulp/paper mill (first loop clear filtrate of a deinked pulp (DIP) line).

Hence, comparative results of the disintegration methods were obtained, wherein labels comprising the PSA layer S1 were disintegrated either according to
 INGEDE METHOD 12 (2013),
 INGEDE METHOD 12 (2013), including a flotation cell treatment, as disclosed in INGEDE METHOD 11 (2012), using tap water or INGEDE METHOD 12 (2013), including a flotation cell treatment, as disclosed in INGEDE METHOD 11 (2012), but using filtrate from pulp/paper mill instead of tap water.

The aim of the experimental test was to see the effect of a flotation treatment and the effect of a filtrate typically used in a flotation treatment to the label comprising the PSA layer S1.

Figure 8:
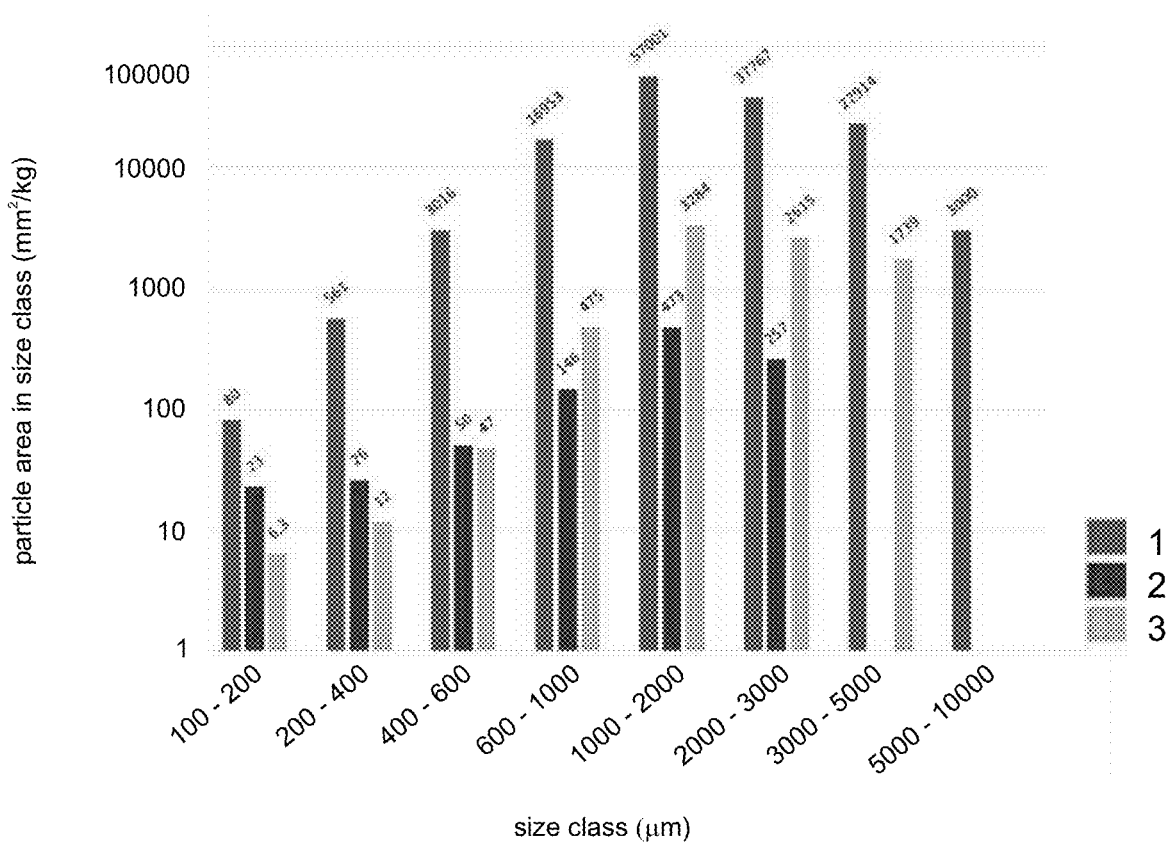
FIG. 8 is a result of an experimental test comparing the effect of flotation treatment and filtrate to the removal efficiency of a label comprising a pressure sensitive adhesive layer composition according to the invention.

Reference is made to FIG. 8, which illustrates the results of the experimental test. The vertical axis illustrates the particle area per 1 kg of the label product in each size class, in units of square millimeters per kilogram (mm²/kg). The horizontal axis illustrates the size class, in units of micrometers (μm). The bars 1, 2, 3, when viewed from left to right in each size class, refer to labels comprising the PSA layer S1 disintegrated according to 1. INGEDE METHOD 12 (2013),
2. INGEDE METHOD 12 (2013), including a flotation cell treatment, as disclosed in INGEDE METHOD 11 (2012), using tap water and
3. INGEDE METHOD 12 (2013), including a flotation cell treatment, as disclosed in INGEDE METHOD 11 (2012), using filtrate from pulp/paper mill.

As visible from FIG. 8, the flotation treatment as shown by the bars 2, 3 has an effect to the removal efficiency of the adhesive layer composition S1. Further, the test demonstrates the recycling compatibility of a label comprising a PSA layer composition S1 in conditions simulating industrial deinking plant, wherein a flotation treatment under standard conditions is used, as shown by the bar 3. The use of a filtrate from pulp/paper mill instead of tap water did not pose a problem. Therefore, the label comprising a PSA layer composition S1, having a coat weight equal to or higher than 10 g/m², is suitable for mechanical separation from a pulp slurry in an industrial scale, at least to an extent that residues which possibly remain in the pulp slurry no longer cause problems in the paper recycling process or later at a paper mill.

For the person skilled in the art, it will be clear that modifications and variations of the label and the method such label are perceivable. The FIGS. 1, 2, 6 and 7 are schematic. Any particular examples which may refer to the accompanying drawings are illustrative and not meant to limit the scope of the invention, which is defined by the appended claims.

The invention claimed is:

1. A recycling compatible label (LAB1), the label (LAB1) comprising
a paper face layer (FLR1) and
a pressure sensitive adhesive layer (ADH1) attachable to a paper (PAP1) surface, the adhesive layer (ADH1) having a coat weight equal to or higher than 10 g/m², when determined as dry adhesive from the label (LAB1) according to FINAT test method no. 12 ($9^{th}$ edition, 2009),
wherein the adhesive layer (ADH1) has a composition which
is free of alkylphenol ethoxylate and
has been selected to comprise
emulsion polymerized, water-dispersible acrylate polymer, and
non-ionic copolymer based on polyethylene glycol and polypropylene glycol,
such that the composition has
a tetrahydrofuran insoluble mass fraction which is to is equal to or higher than 65 wt.-%, when determined by gravimetric means using a Soxhlet extractor,
a static shear which is equal or higher than 10000 minutes, when determined from a glass plate at a temperature of 25° C. according to FINAT test method no. 8 ($9^{th}$ edition, 2009),
a loss modulus (G") and a storage modulus (G') which are higher than 50000 Pascal, when determined at a temperature of 25° C., and wherein
the ratio (tan δ) of the loss modulus (G") to the storage modulus (G') is less than 0.56, when determined with parallel plates geometry of 8 mm diameter and a gap of 1 mm, at 0.5% strain, at 1 Hz frequency, under temperature ramp having a linear rate of 2° C./min in a temperature range of −45° C. to 100° C., in accordance with ISO standard 6721-10 (version 2015),
such that after disintegration of the label (LAB1) according to INGEDE Method 12 (2013) for PSA applications, the label (LAB1) is recycling compatible, when determined according to the European Paper Recycling Council Assessment of Printed Product Recyclability (15 Mar. 2018).

2. The label (LAB1) according to claim 1, wherein the emulsion polymerized, water-dispersible acrylate polymer has been selected from the group consisting of acrylic homopolymers, vinyl/acrylic copolymers, styrene/acrylic copolymers, vinyl homopolymers, styrene homopolymers, and any combination thereof.

3. The label (LAB1) according to claim 1, wherein the emulsion polymerized, water-dispersible acrylate polymer is a copolymer comprising acrylic acid and methacrylic acid.

4. The label (LAB1) according to claim 1, wherein the emulsion polymerized, water-dispersible acrylate polymer comprises methacrylic acid, acrylic acid, 2-ethylhexyl ester, acrylonitrile, N-methylolacrylamide, acrylamide and formaldehyde.

5. The label (LAB1) according to claim 1, wherein the non-ionic copolymer based on polyethylene glycol and polypropylene glycol is a difunctional block copolymer terminating in primary hydroxyl groups.

6. The label (LAB1) according to claim 1, wherein at a temperature in the range of 40 to 55° C., the composition has a ratio (tan δ) of the loss modulus (G") to the storage modulus (G') equal to or less than 0.5.

7. The label (LAB1) according to claim 1, wherein the static shear of the composition is equal to or higher than 1000 minutes at a temperature of 35° C. and 75% relative humidity, when determined according to modified FINAT test method no. 8 ($9^{th}$ edition, 2009) from a glass plate.

8. The label (LAB1) according to claim 1, wherein the composition has
a number average molecular weight ($M_n$) that is equal to or less than 45000 g/mol, preferably in the range of 35000-45000 g/mol, and/or
a mass average molecular weight ($M_w$) that is equal to or less than 175000 g/mol, and/or
a polydispersity ($M_w/M_n$) that is between 2 and 4, when determined from tetrahydrofuran soluble mass fraction by means of gel permeation chromatography according to standard CEN/TS 14577 (2003).

9. The label (LAB1) according to claim 1, wherein the label has a $S_{2000}$-value equal to or less than 23% after disintegration of the label, when determined according to INGEDE Method 12 (2013) for PSA applications.

10. The label (LAB1) according to claim 1, wherein the face layer (FLR1) is paper that contains cellulose fibres and the paper has
substance in the range of 60 to 80 g/m², when determined according to standard ISO 536, caliper in the range of 60 to 80 micrometers, when determined according to standard ISO 534, tensile strength in the machine direction in the range of 4.5 to 6 kN/m, when determined according to standard ISO 1924/1, tensile strength in the cross-direction in the range of 2.5 to 3 kN/m, when determined according to standard ISO 1924/1, and/or roughness in the range of 1 to 3 micrometers, when determined according to standard ISO 8791.

11. The label (LAB1) according to claim 1, the pressure sensitive adhesive layer having a loop tack value in the range of 6 to 10 Newton, when determined according to FINAT test method no. 9 ($9^{th}$ edition, 2009).

12. The label (LAB1) according to claim 1, the pressure sensitive adhesive layer (ADH1) having a peel adhesion equal to or higher than 3 Newton, when determined from a glass plate and/or a peel adhesion equal to or higher than 2 Newton, when determined from a HDPE plate, according to FINAT test method no. 2 ($9^{th}$ edition, 2009).

13. The label (LAB1) according to claim 1, the pressure sensitive adhesive layer (ADH1) having a coat weight in the range of 10 to 23 g/m$^2$, when determined as dry adhesive from the label (LAB1) according to FINAT test method no. 12 ($9^{th}$ edition, 2009).

14. The label (LAB1) according to claim 1, wherein the emulsion polymerized, water-dispersible acrylate polymer has been formed of monomers without vinyl acetate.

15. The label (LAB1) according to claim 1, wherein the label is recycling compatible such that the label has a Removal Score which is equal to or higher than 51 points, when determined according to the European Paper Recycling Council Assessment of Printed Product Recyclability (15 Mar. 2018).

* * * * *